US012395808B2

(12) United States Patent
Fazi et al.

(10) Patent No.: US 12,395,808 B2
(45) Date of Patent: Aug. 19, 2025

(54) LOUDSPEAKER CONTROL

(71) Applicant: Audioscenic Limited, Southampton (GB)

(72) Inventors: Filippo Maria Fazi, Southampton (GB); Andreas Franck, Southampton (GB); Marcos Simón, Southampton (GB)

(73) Assignee: Audioscenic Limited, Southampton (GB)

( * ) Notice: Subject to any disclaimer, the term of this patent is extended or adjusted under 35 U.S.C. 154(b) by 134 days.

(21) Appl. No.: 17/848,013

(22) Filed: Jun. 23, 2022

(65) Prior Publication Data

US 2023/0007424 A1 Jan. 5, 2023
US 2024/0323632 A2 Sep. 26, 2024

(30) Foreign Application Priority Data

Jun. 28, 2021 (GB) ..................................... 2109307

(51) Int. Cl.
*H04S 7/00* (2006.01)
*H04R 1/40* (2006.01)

(52) U.S. Cl.
CPC ............ *H04S 7/302* (2013.01); *H04R 1/403* (2013.01); *H04S 2400/01* (2013.01)

(58) Field of Classification Search
CPC ...... H04S 7/302; H04S 2400/01; H04R 1/403
See application file for complete search history.

(56) References Cited

U.S. PATENT DOCUMENTS 6,243,476 B1 6/2001 Gardner
10,945,090 B1 * 3/2021 Choisel .................. H04S 7/303

(Continued)

FOREIGN PATENT DOCUMENTS

EP 2 930 953 A1 10/2015
EP 3 024 252 A1 5/2016

(Continued)

OTHER PUBLICATIONS

Van Veen, B.D., and Buckly, K.M., "Beamforming: A Versatile Approach to Spatial Filtering," IEEE, ASSP Magazine, No. 5, pp. 4-24 (Apr. 1988).

(Continued)

*Primary Examiner* — Daniel R Sellers
(74) *Attorney, Agent, or Firm* — Hamilton, Brook, Smith & Reynolds, P.C.

(57) ABSTRACT

There is provided a computer-implemented method of generating audio signals for an array of loudspeakers, the method comprising: receiving a plurality of input audio signals, wherein a respective one of the plurality of input audio signals is to be reproduced, by the array, at each of a plurality of control points in an acoustic environment, and wherein each of the plurality of control points is associated with a respective one of a plurality of loudspeaker groups; receiving an estimate of a position of each of the plurality of control points; assigning, using the received estimate of the position of each of the plurality of control points, each of the loudspeakers in the array to at least one of the plurality of loudspeaker groups, wherein the assigning of a particular loudspeaker to a particular loudspeaker group is based on a relative position of the particular loudspeaker with respect to one or more of the at least one control points associated with the particular loudspeaker group; and generating a respective output audio signal for each of the loudspeakers in the array by applying a set of filters to the plurality of input audio signals, the output audio signal for a particular loudspeaker being generated according to the at least one loudspeaker group to which the particular loudspeaker is assigned.

20 Claims, 18 Drawing Sheets

(56) References Cited

U.S. PATENT DOCUMENTS

| | | | | |
|---|---|---|---|---|
| 11,792,596 | B2 | 10/2023 | Fazi et al. | |
| 2006/0062410 | A1 | 3/2006 | Kim et al. | |
| 2006/0204022 | A1* | 9/2006 | Hooley | H04R 1/403 381/117 |
| 2008/0025534 | A1 | 1/2008 | Kuhn et al. | |
| 2008/0273714 | A1* | 11/2008 | Hartung | H04R 3/12 381/86 |
| 2010/0150361 | A1 | 6/2010 | Kim et al. | |
| 2011/0103625 | A1 | 5/2011 | Srinivasan | |
| 2012/0014525 | A1 | 1/2012 | Ko | |
| 2013/0279723 | A1 | 10/2013 | Hooley et al. | |
| 2014/0270187 | A1 | 9/2014 | Hall et al. | |
| 2016/0080885 | A1 | 3/2016 | Hampiholi et al. | |
| 2017/0332184 | A1 | 11/2017 | Lacouture | |
| 2017/0347216 | A1 | 11/2017 | Khabbazubasnebj | |
| 2018/0035202 | A1* | 2/2018 | Borss | H04R 1/403 |
| 2018/0192226 | A1 | 7/2018 | Woelfl | |
| 2019/0090060 | A1* | 3/2019 | Fazi | H04R 5/04 |
| 2020/0374624 | A1 | 11/2020 | Koschak et al. | |
| 2021/0204085 | A1* | 7/2021 | Claar | H04S 7/305 |
| 2021/0385605 | A1 | 12/2021 | Fazi et al. | |

FOREIGN PATENT DOCUMENTS

| | | | |
|---|---|---|---|
| WO | WO 2012/036912 | A1 | 3/2012 |
| WO | WO 2012/068174 | A2 | 5/2012 |
| WO | WO 2014/151817 | A2 | 9/2014 |
| WO | WO 2017/063688 | A1 | 4/2017 |
| WO | WO 2017/158338 | A1 | 9/2017 |
| WO | WO 2017/201603 | A1 | 11/2017 |

OTHER PUBLICATIONS

Nelson, P.A., et al., "Inverse Filters for Multi-Channel Sound Reproduction," IEICE Trans. Fundamentals, E75-A (11): 1468-1473 (Nov. 1992).

Choueiri, E. Y., "Optimal Crosstalk Cancellation for Binaural Audio with Two Loudspeakers," Princeton University, 24 pages (2010).

Hamdan E. C., et al., "Three-channel Crosstalk Cancellation Mode Efficiency for Sources in the Far-Field," Audio Engineering Society, Conference Paper 81, 10 pages (2019).

Kirkeby, O. et al., "Fast Deconvolution of Multichannel Systems Using Regularization," IEEE Transactions on Speech and Audio Processing, vol. 6, No. 2, pp. 189-195 (1998).

Kirkeby, O., "Digital Filter Design for Inversion Problems in Sound Reproduction," Surround Sound Processing, J. Audio Eng. Soc., vol. 47, No. 7/8, pp. 583-595 (1999).

Lentz, T., "Dynamic Crosstalk Cancellation for Binaural Synthesis in Virtual Reality Environments," Engineering Reports, J. Audio Eng. Soc., vol. 54, No. 4, pp. 283-294 (2006).

Masiero, B. and M. Vorländer, "A Framework for the Calculation of Dynamic Crosstalk Cancellation Filters," IEEE Transactions on Audio, Speech, and Language Processing, vol. 22, No. 9, 11 pages (2014).

Nelson, P. A. and S. J. Elliott, *Active Control of Sound*. London: Academic Press, 1992.

Nelson, P.A., et al., "Adaptive Inverse Filters for Stereophonic Sound Reproduction," IEEE Transactions on Signal Processing, vol. 40, No. 7, pp. 1621-1632 (1992).

Osmant, A., "3D Audio for 3D TV," Press Release—Cambridge Mechatronics and Princeton University's 3D3A Lab team up to offer 3D Sound for 3D TVs, 2 pages (2011).

Simón Gálvez, Marcos F. et al., "Time Domain Optimization of Filters Used in a Loudspeaker Array for Personal Audio," IEEE/ACM Transactions on Audio, Speech, and Language Processing, vol. 23, No. 11, 10 pages (Nov. 2015).

Simón Gálvez, Marcos F. et al., "A Robustness Study for Low-Channel-Count Cross-Talk Cancellation Systems," Audio Engineering Society Conference Paper 74, 9 pages (2019).

Xie, Bosun, "Binaural Reproduction through Loudspeakers," Chapter 9, Head-Related Transfer Function and Virtual Auditory Display, J. Ross Publishing, pp. 283-326 (2013).

* cited by examiner

LOUDSPEAKER CONTROL

RELATED APPLICATION

This application claims priority under 35 U.S.C. § 119 or 365 to Great Britain Application No. 2109307.5, filed Jun. 28, 2021. The entire teachings of the above application(s) are incorporated herein by reference.

FIELD

The present disclosure relates to a method of generating audio signals for an array of loudspeakers and a corresponding apparatus and computer program.

BACKGROUND

Loudspeaker arrays may be used to reproduce a plurality of different audio signals at a plurality of control points. The audio signals that are applied to the loudspeaker array are generated using filters, which may be designed so as to avoid cross-talk. However, the determination of the weights of these filters may be computationally expensive, particularly if the control points are moving and the filter weights thus need to be computed in real-time. This may, for example, be the case if the control points correspond to listeners' positions in an acoustic environment.

A previous approach to determining filter weights for a loudspeaker array is described in WO 2017/158338 A1.

SUMMARY

Aspects of the present disclosure are defined in the accompanying independent claims.

BRIEF DESCRIPTION OF THE DRAWINGS

Examples of the present disclosure will now be explained with reference to the accompanying drawings in which.

Throughout the description and the drawings, like reference numerals refer to like parts.

DETAILED DESCRIPTION

In general terms, the present disclosure relates to a method of generating audio signals for an array of loudspeakers to reproduce a plurality of input audio signals at a respective plurality of control points in a manner that avoids cross-talk, i.e., that reduces the extent to which an audio signal to be reproduced at a first control point is also reproduced at other control points, whilst avoiding latency. A set of filters is applied to the input audio signals to obtain the plurality of output audio signals which are output to the array of loudspeakers. The present disclosure relates primarily to ways of determining those filters.

Figure 1:
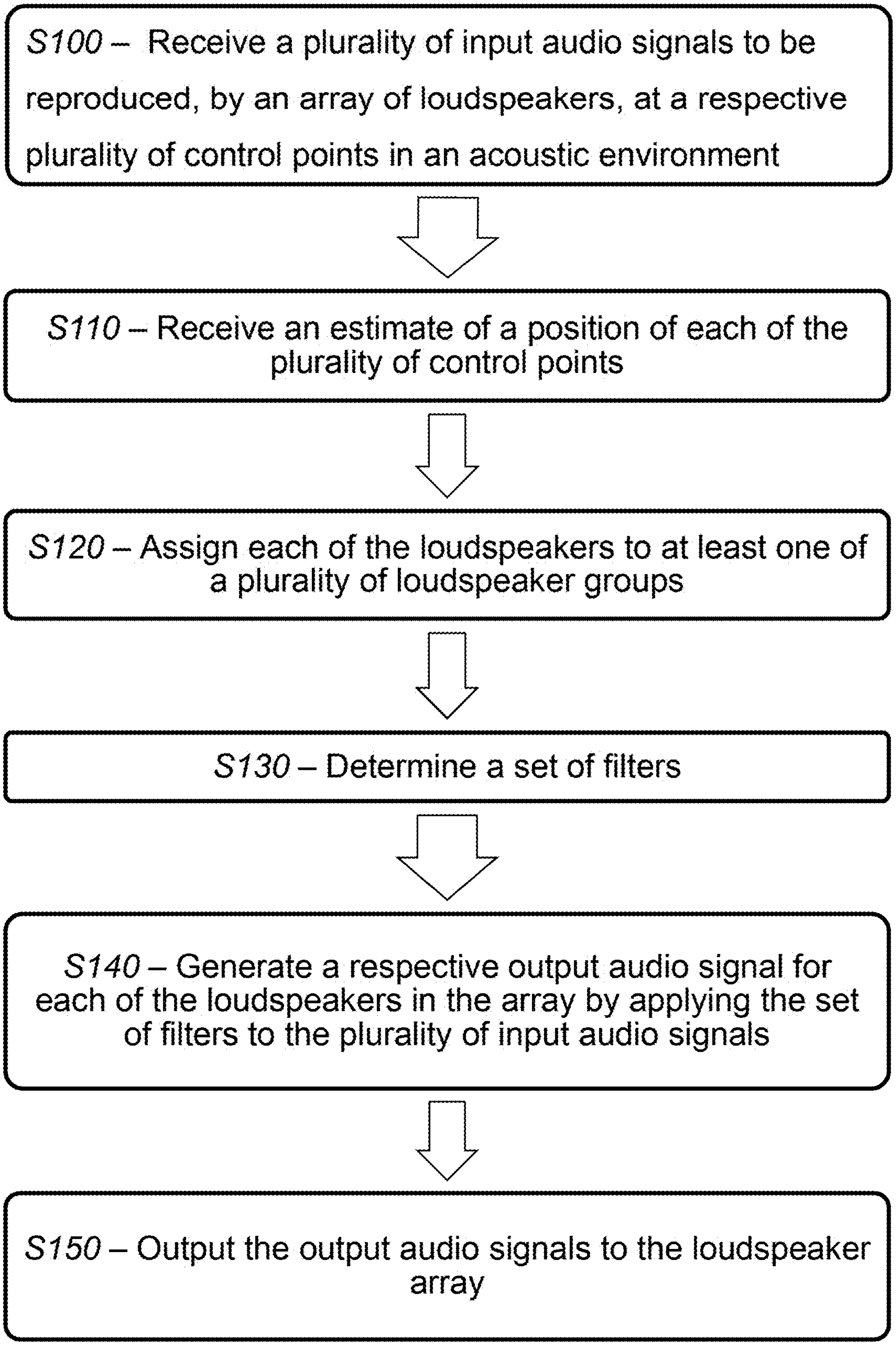
FIG. 1 shows a method of generating audio signals for an array of loudspeakers.

A method of generating audio signals for the array of loudspeakers is shown in FIG. 1.

At step S100, a plurality of input audio signals are received. A respective one of the plurality of input audio signals is to be reproduced, by the array, at each of a plurality of control points in an acoustic environment, e.g., a first input audio signal is to be reproduced at a first control point, and a second input audio signal is to be reproduced at a second control point and a third control point. Each of the plurality of control points is associated with a respective one of a plurality of loudspeaker groups, e.g., the first control point is associated with a first loudspeaker group and the second and third control points are associated with a second loudspeaker group.

At step S110, an estimate of a position of each of the plurality of control points is received, e.g., from a position sensor.

At step S120, each of the loudspeakers in the array is assigned to at least one of the plurality of loudspeaker groups, e.g., a first, second and third loudspeaker may be assigned to the first loudspeaker group, and the third, a fourth and a fifth loudspeaker may be assigned to the second loudspeaker group. The assigning may be using the received estimate of the position of each of the plurality of control points.

As will be explained in more detail, the assigning of a particular loudspeaker to a particular loudspeaker group is based on a relative position of the particular loudspeaker with respect to one or more of the at least one control points associated with the particular loudspeaker group. For example, the assigning of the third loudspeaker to a particular loudspeaker group may be based on a relative position of the third loudspeaker with respect to 1) the first control point (the control point associated with the first loudspeaker group) and 2) the second and/or third control points (the control points associated with the second loudspeaker group); if the third loudspeaker is closer to the first control point than to the second and/or third control points, the third loudspeaker may be assigned to the first loudspeaker group.

At step S130, a set of filters may be determined based on the assigning of loudspeakers to groups. The manner in which the set of filters is determined is described in detail below.

At step S140, a respective output audio signal for each of the loudspeakers in the array is determined by applying the set of filters to the plurality of input audio signals. The output audio signal for a particular loudspeaker is generated according to the at least one loudspeaker group to which the particular loudspeaker is assigned.

The set of filters may be applied in the frequency domain. In this case, a transform, such as a fast Fourier transform (FFT), is applied to the input audio signals, the filters are applied, and an inverse transform is then applied to obtain the output audio signals.

At step S150, the output audio signals may be output to the loudspeaker array.

Steps S100 to S150 may be repeated with another plurality of input audio signals. These steps may be repeated in real time.

As steps S100 to S150 are repeated, the set of filters may remain the same, in which case step S130 need not be repeated, or may change. Similarly, if the position of each of the plurality of control points is known not to, or is assumed not to, change for a particular amount of time, then steps S110 to S130 need not be repeated for that particular amount of time.

As one example, steps S110, S120 and S130 can be performed once, during an initialisation phase, and need not be repeated thereafter. For example, the estimates of the positions of each of the plurality of control points may be based on a model rather than being received from a position sensor, and the group assignment of step S120 and/or the set of filters of step S130 may be pre-computed.

A method of determining a set of filters may be performed using steps S110 to S130. By performing such a method, the set of filters can be pre-computed, for example, when programming a device to perform the method of FIG. 1. Later, the determined set of filters can be used in a method of generating output audio signals by performing steps S100 and S140 to S150. The need to perform steps S110 to S130 in real time can thus be avoided, thereby reducing the computational resources required to implement the method of FIG. 1.

Similarly, if the position of each of the plurality of control points changes over time but it is known, or is assumed, that their movement will be such that the assigning step 120 will not change over time (for example, if each of the plurality of control points is determined to remain within a respective given region of space), then step S120 need not be repeated for that particular amount of time. For example, step S120 can be performed once, during an initialisation phase, and need not be repeated thereafter (unless, for example, it is determined that at least one of the plurality of control points no longer remains within the respective given region of space).

As would be understood by a skilled person, the steps of FIG. 1 can be performed with respect to successively received frames of a plurality of input audio signals. Accordingly, steps S100 to S150 need not all be completed before they begin to be repeated. For example, in some implementations, step S100 is performed a second time before step S150 has been performed a first time.

Figure 2:
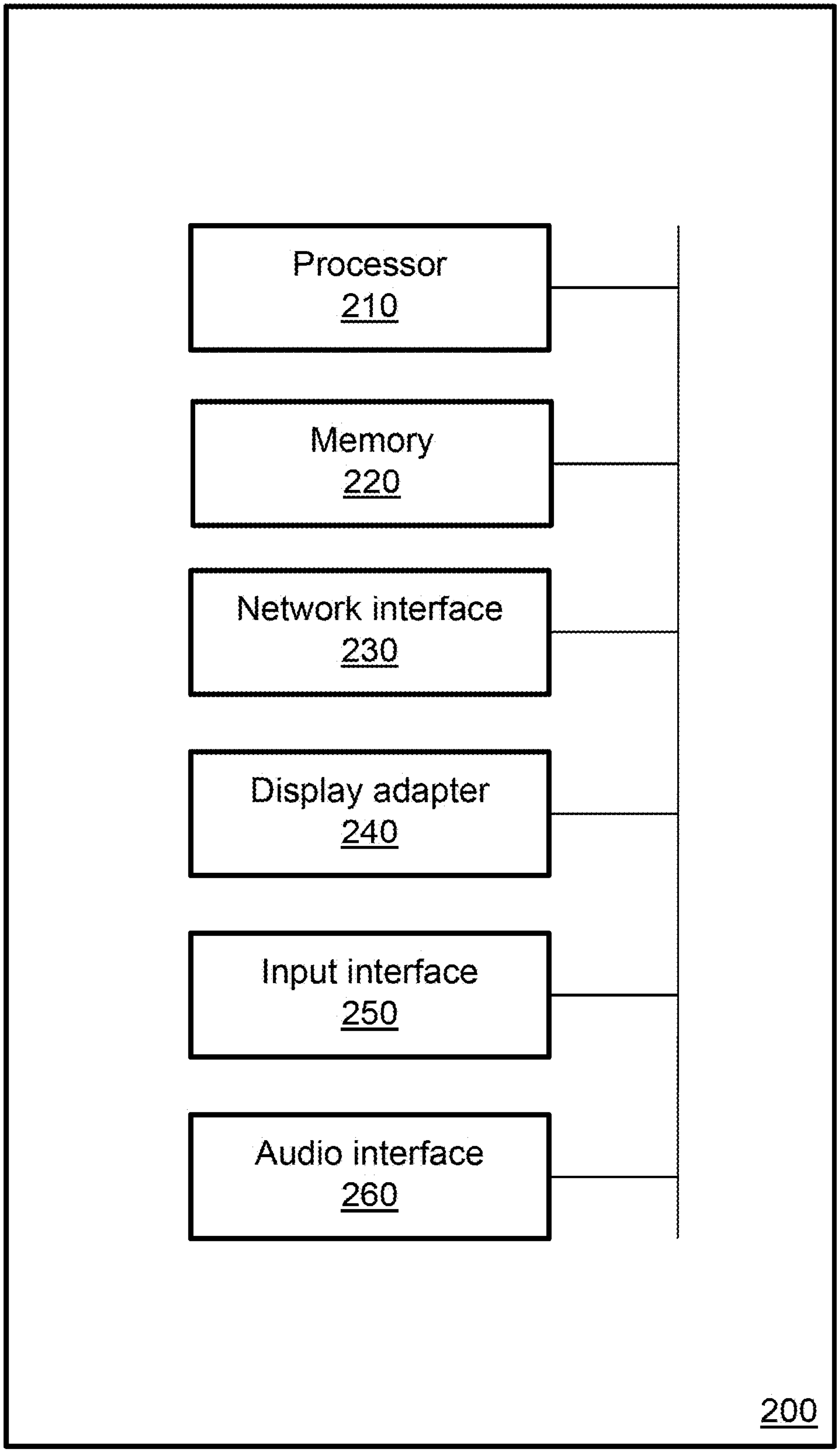
FIG. 2 shows an apparatus for generating audio signals for an array of loudspeakers which can be used to implement the method of FIG. 1.

A block diagram of an exemplary apparatus 200 for implementing any of the methods described herein, such as the method of FIG. 1, is shown in FIG. 2. The apparatus 200 comprises a processor 210 (e.g., a digital signal processor) arranged to execute computer-readable instructions as may be provided to the apparatus 200 via one or more of a memory 220, a network interface 230, or an input interface 250.

The memory 220, for example a random-access memory (RAM), is arranged to be able to retrieve, store, and provide to the processor 210, instructions and data that have been stored in the memory 220. The network interface 230 is arranged to enable the processor 210 to communicate with a communications network, such as the Internet. The input interface 250 is arranged to receive user inputs provided via an input device (not shown) such as a mouse, a keyboard, or a touchscreen. The processor 210 may further be coupled to a display adapter 240, which is in turn coupled to a display device (not shown). The processor 210 may further be coupled to an audio interface 260 which may be used to output audio signals to one or more audio devices, such as a loudspeaker array 300. The audio interface 260 may comprise a digital-to-analog converter (DAC) (not shown), e.g., for use with audio devices with analog input(s).

Various approaches for determining the set of filters are now described.

FIELD

The present disclosure relates to the field of audio reproduction systems with loudspeakers and audio digital signal processing. More specifically, the disclosure encompasses systems to perform sound-field control and control the sound field at two or more different points in space. This can be used to create personal virtual acoustic images through a plurality of loudspeakers and the use of cross-talk cancellation or beamforming with minimum latency (by controlling the sound pressure at the two ears of the listener) or for multi-zone audio reproduction (two or more different signals delivered two or more different zones in space).

Practical Problem to be Solved

Consider the case when we want to use an array of L loudspeakers, to control the reproduced sound pressure at two or more points in space and deliver an independent signal to each control point. This is achieved by creating a signal processing apparatus that takes the two or more inputs signals $d_1$, $d_2$, . . . and generates L loudspeaker signals. The signal processing apparatus includes one or multiple bank of filters. These filters may be non-causal, or may include delays that, in general, affect the input-output latency, hereafter succinctly referred to as latency. The present disclosure proposes a strategy to minimise the latency of the signal processing apparatus.

It is shown below that, in the general case, the control filters are non-causal IIR filters. They can be approximated as causal FIR filters by truncation and by applying a large modelling delay. This, however, comes at the cost of a significant system latency.

It is shown below that the lack of causality of the control filter is caused by the fact that the determinant of the matrix to be inverted for the filter computation is not minimum phase. The present disclosure devises a strategy to ensure the determinant is causal.

Technical Solutions

Creating audio signal processing strategies to perform sound-field control has been the focus of the industry and academia for many years. The motivation is to accurately control sound radiation from a set of speakers to achieve a desired sound-field reproduction pattern to yield a particular sound effect. Such effects are for example: to create a perceived direction of sound propagation, to create zones of differentiated acoustic pressure inside an environment for delivery of independent sound content (also known as sound zoning or personal audio) or to accurately control sound pressure at the listeners ears to deliver 3D sound, commonly known as cross-talk cancellation (CTC). The approach of the present disclosure can be used to achieve all these effects.

Sound-field control audio reproduction systems require solving an electro-acoustic problem that is based on the inversion of the electro-acoustic path between loudspeakers and the listener's ears. The solution of such problem yields a set of electrical or, in the field of this disclosure, digital filters that applied to the loudspeaker input signals yield a given sound propagation pattern. Previous art for creating digital filters for sound-field control require the digital filter to have certain time and frequency constraints. Considering an audio reproduction system using just two loudspeakers, the first constraint is to control the norm of the digital filters so that these do not produce audible colouration and artefacts and, furthermore, do not excessively boost the loudspeakers with the risk of damaging them. In order to solve such problem, the most common solution is the use of Tychonov regularisation. Although this technique may seem good to control the filter energy usage, the use of Tychonov regularisation introduces the need of applying a modelling delay to the filters time series. Depending on the application, the added modelling delay may not be desirable, as the total system latency of the digital filters is dependent on the filter length. Techniques exist that can minimise latency for systems using just two loudspeakers, however the latency problem cannot be easily avoided if more than two loudspeakers are employed in an array, even if no regularisation is used.

Sound-field control systems using more than two loudspeakers have been shown to be desirable, as they minimise the effect of room reflections and also provide a better acoustic control over the whole audio-frequency range. The use of more than two loudspeakers, however, requires the introduction of a modelling delay. Previous techniques have shown that the modelling delay can be minimised if the electro-acoustic problem is solved following a time-domain approach rather than a frequency-domain approach. In practice, time-domain based techniques require the calculation of very large inverse matrices, which is not possible in the context of real-time adaptive systems that require to constantly calculate and adapt the digital control filters according to the instantaneous position of the pressure control points. Therefore, new techniques that allow for the minimisation of the filter processing latency with loudspeaker arrays are required.

The approach of the present disclosure, Technology 3, introduces a strategy to satisfy such needs. By splitting the process between the loudspeaker array filters it is possible to minimise the filter latency to "zero" latency in the case of a symmetric listener or to "quasi-zero" latency for the case when listeners are not place symmetrically with respect to a loudspeaker array. The approach of the present disclosure is generalised with respect to all loudspeaker array control techniques (Technology 1 and non-Technology 1).

Theoretical Definition of Problem

As explained below, the novel signal processing strategy disclosed in this document is based on splitting the loudspeakers into two or more groups. Each group of loudspeakers is associated to one control point. The system takes M signals as input, each of which is supposed to be delivered to a given control point, but not to the others (for example, signal $d_1$ is expected to be delivered to the control point at $x_1$ and not to at $x_2$, $x_3$ etc.). If the system is fed with only one of the M signals, say $d_1$, while $d_2=d_3=\ldots=0$, the signal processing apparatus will be such that the first group of loudspeakers will create a sound beam to deliver the signal $d_1$ to control point $x_1$, whilst the second set of loudspeakers will create a sound beam to cancel any leakage of signal $d_1$ at control point $x_2$, the third set of loudspeakers will create a sound beam to cancel the leakage of signal $d_1$ to control point $x_3$, and so on. As explained below, if the two or more groups of loudspeakers are chosen wisely, the method ensures that all digital filters are causal or require a very short modelling delay to become causal. This minimises the input-output latency of the system.

On the contrary, it is shown below that when the number of loudspeakers is equal or larger than 3 the digital filter computed with a conventional approach (i.e. without the method disclosed here) will, in general, be non-causal. This means that the output of the filters depends, in theory, on both past and future values of the input. These filters can be approximated as causal FIR filters, but at the cost of introducing a long modelling delay and therefore increasing the system latency.

In what follows, we first introduce the geometry and variables needed to study this problem. We will then demonstrate with numerical examples that the control filters of implementations common in the state of the art are non-causal and show that this is caused by the fact that the determinant of the matrix to be inverted is not minimum-phase and non-causal. We will then disclose our strategy to subdivide the loudspeaker into groups and demonstrate, again with numerical examples, that this approach allows for the determinant of the matrix to be minimum phase and therefore for the design of causal control filters (if a small modelling delay is applied). For completeness, a mathematical proof is provided of the (lack of) causality of the filters in the simple case of 2 control points and free-field transfer functions.

Figure 3:
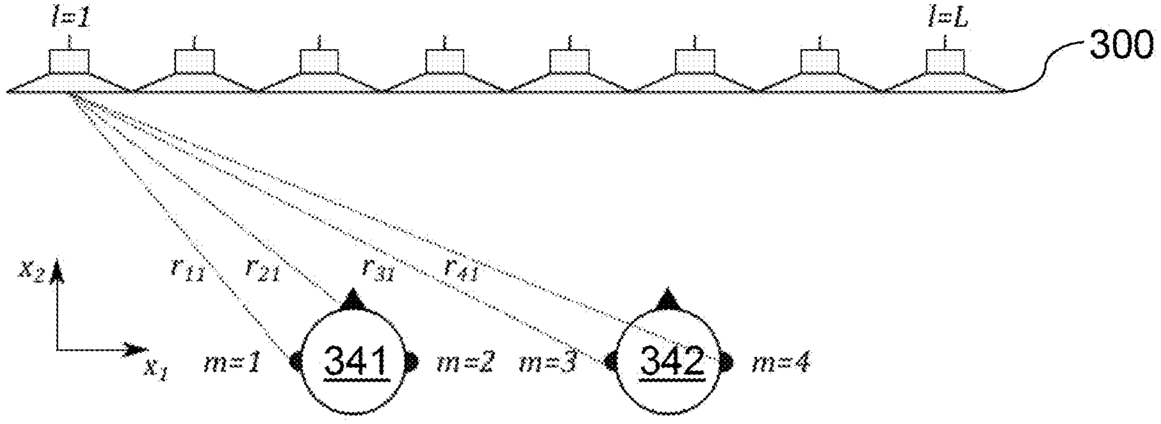
FIG. 3 shows a control geometry for an array of L speakers and four acoustic control points $x_1$ to $x_M$ with M=4, which correspond, in this case, to the ears of two listeners.

Consider a system with a reference geometry as reported in FIG. 3. The spatial coordinates of the loudspeakers are $y_1, \ldots, y_L$ whereas the coordinates of the M control points are $x_1, \ldots, x_M$. The matrix S(ω), hereafter referred to as plant matrix, whose element $S_{m,\ell}(\omega)$ is the electro-acoustical transfer function between the $\ell$-th loudspeaker and the m-th control point, expressed as a function of the angular frequency ω. The reproduced sound pressure signals at the M control points, $p(\omega)=[p_1(\omega), \ldots, p_M(\omega)]^T$, for a given frequency ω are given by p(ω)=S(ω)q(ω), where q(ω) is a vector whose L elements are the loudspeaker signals. These are given by q(ω)=H(ω)d(ω), where d(ω) is a vector whose two elements are the M signals intended to be delivered to the various control points. H(ω) is a complex-valued matrix that represents the effect of the signal processing apparatus, hereafter succinctly referred to as "filters". It should be clear though that each element of H(ω) is not necessarily a single filter but can be the result of a combination of filters, delays, and other signal processing blocks.

In what follows, the dependency of variables on the frequency ω will be dropped to simplify the notation. We have therefore that $$p=SHd \tag{1}$$

An approach to design the filters is to compute H as the (regularised) inverse or pseudo-inverse of matrix S, or of a model of matrix S, that is $$H=e^{-j\omega T}G^H(GG^H+A)^{-1} \tag{2}$$

where matrix G is our model or estimate of the plant matrix S, A is a regularisation matrix (for example for Tikhonov regularisation), $[\bullet]^H$ is the complex-transposed (Hermitian) operator, $j=\sqrt{-1}$, and T is a modelling delay. A straightforward implementation of this expression leads to a signal flow as using bank of MXL filters, as shown in the block diagram of FIG. 4.

If, on the one hand, designing the filters on the basis of equation 2 allows for an effective delivery of independent signals to the two control points, on the other hand, when the number of loudspeakers L is larger than 3, the elements of H are non-causal IIR filters. They can be approximated by causal filters by applying a modelling delay to the elements of H (and by truncating the filters in the time domain, or equivalently by applying a frequency sampling approach), but this comes at the cost of significantly increasing the system latency.

Figure 5:
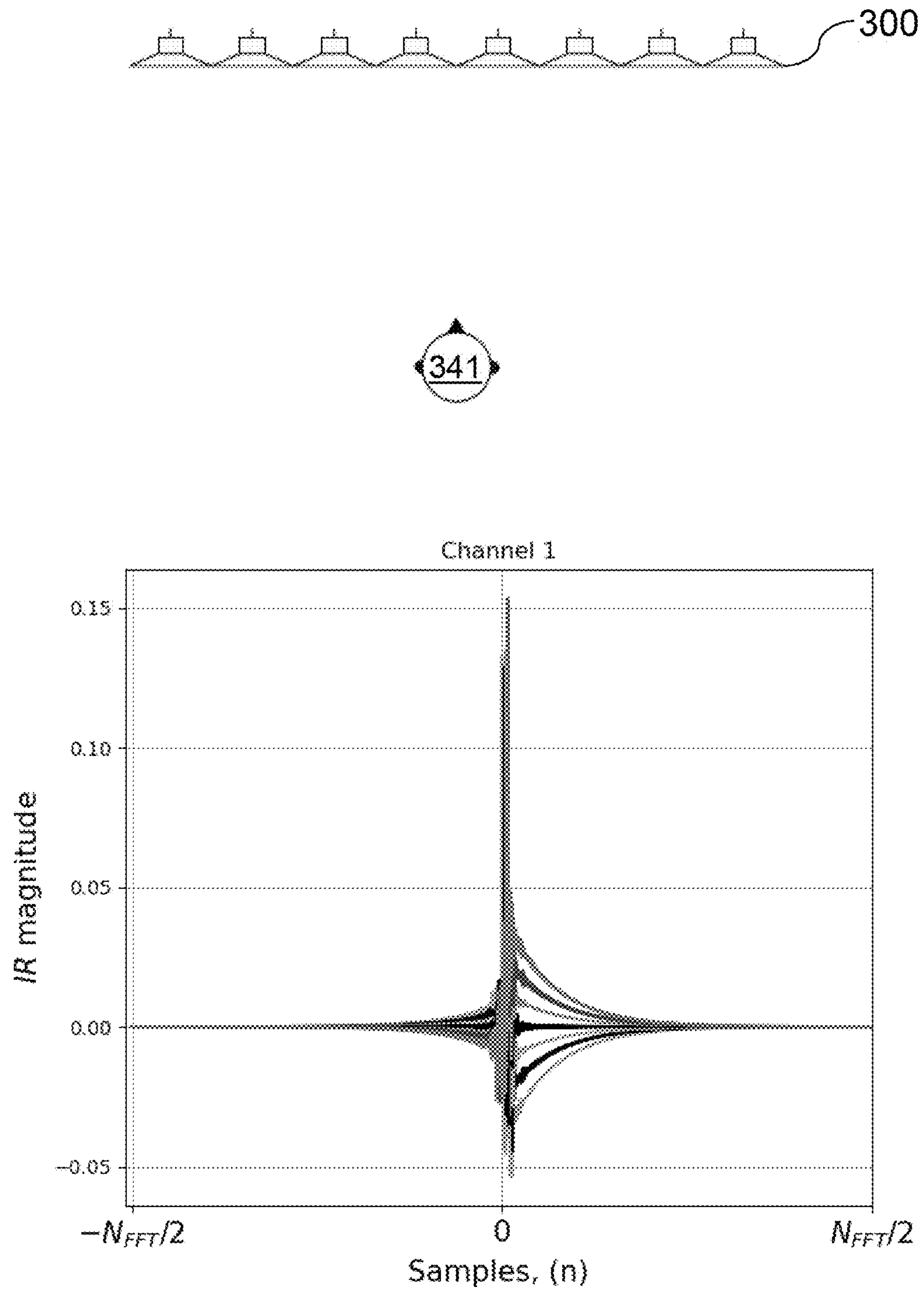
FIG. 5 shows a control geometry and corresponding array filters using a MIMO approach as calculated with Eq. 2.

To illustrate this effect, let's consider a simple set-up consisting of an array of a plurality of loudspeakers and 2 control points located at the ear of a listener, as shown in FIG. 5. In this numerical example, the loudspeakers are modelled as ideal omnidirectional sources radiating in free field. The bottom of FIG. 5 shows the loudspeaker array filters, computed with equation 2 and no modelling delay (T=0). In this case, it can be clearly observed that these control filters are non-causal, as a clear "pre-ringing" is present. A closer analysis reveals that the filters are (as it will be shown later) non-causal IIR filters. The common strategy to overcome this issue is to apply a modelling delay of $N_{FFT}/2$, but this will of course have a significant effect on the latency of the system. In any case, since the control filters are non-causal IIR, the lack of causality could never be completely compensated by a modelling delay. An objective of the approach of the present disclosure is therefore to eliminate the non-causal pre-ringing in the filters.

Explanation of Non-Causality

Equation 2 can be rewritten as $$H = e^{-j\omega T} G^H adj(GG^H + A)\frac{1}{\det(GG^H + A)} \tag{3}$$

Figure 6A:
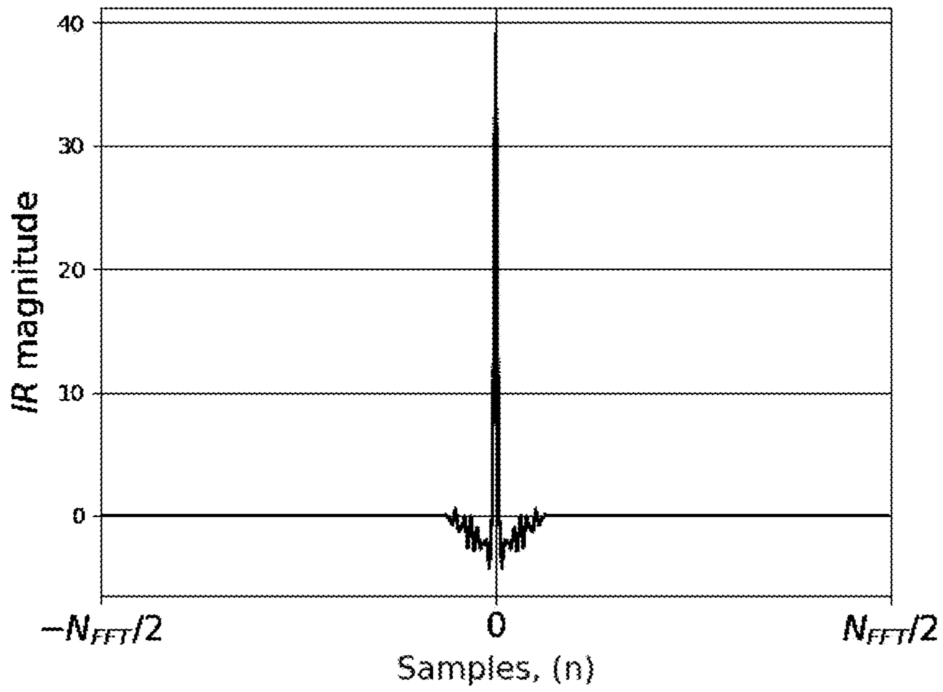
FIGS. 6*a* and 6*b* show impulse responses of the determinant (FIG. 6*a*) and the determinant inverse (FIG. 6*b*) for a multi-speaker MIMO array system (filters created according to Eq. 2) controlling the acoustic pressure at two control points—it can be observed how both responses present pre-ringing to negative time positions.
Figure 6B:
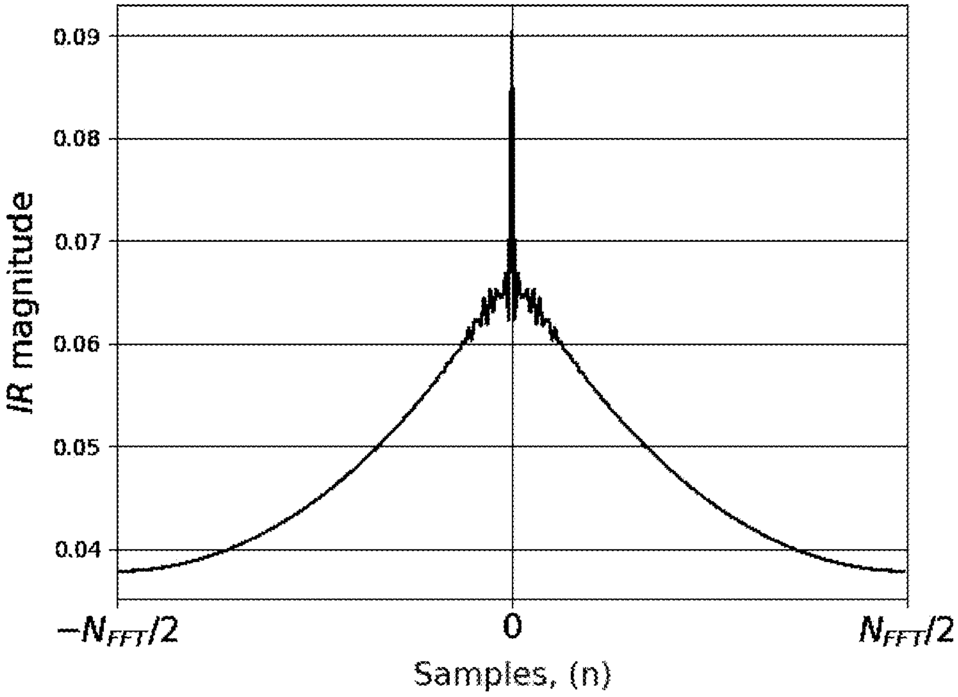

Each of the terms of this equation can be studied independently. To simplify the analysis, assume that T=0 and A is a diagonal, real-valued, and frequency independent matrix, and that all elements of matrix G can be represented as FIR filters. Because of the latter assumption, then also the elements of $G^H$ and $adj(GG^H+A)$ are FIR filters (not necessarily causal), as they are given by products (in the frequency domain) and sums of FIR filters. For the same reason, $\det(GG^H+A)$ is an FIR filter. Its inverse, on the other hand, is an IIR filter. Matrix $(GG^H+A)$ is a Gramian matrix and as such it is positive semi-definite and its eigenvalues and determinant are real and non-negative. This implies that $\det(GG^H+A)$, as well as its inverse, are zero-phase filters, whose impulse response are symmetric with respect to time t=0, and therefore non-causal. FIG. 6*a* shows the impulse response of $\det(GG^H+A)$ and FIG. 6*b* shows the impulse response of the determinant's inverse, $$\frac{1}{\det(GG^H + A)},$$

both plots for the case of M=2 introduced above. Non-causal pre-ringing is clearly observable in both filters.

Technology 1: Signal Flow Simplification

Figure 4:
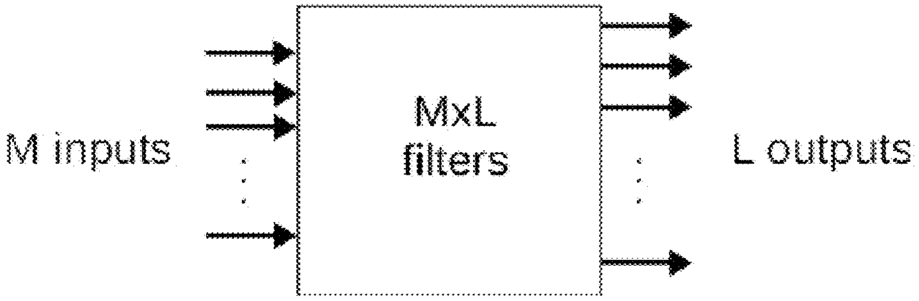
FIG. 4 shows a simplified signal processing diagram of a multiple input multiple output (MIMO) control process used in array signal processing to reproduce M input signals with L loudspeakers.

FIG. 4 shows a simplified signal processing diagram of a multiple input multiple output (MIMO) control process used in array signal processing to reproduce M input signals with L loudspeakers.

Figure 8:
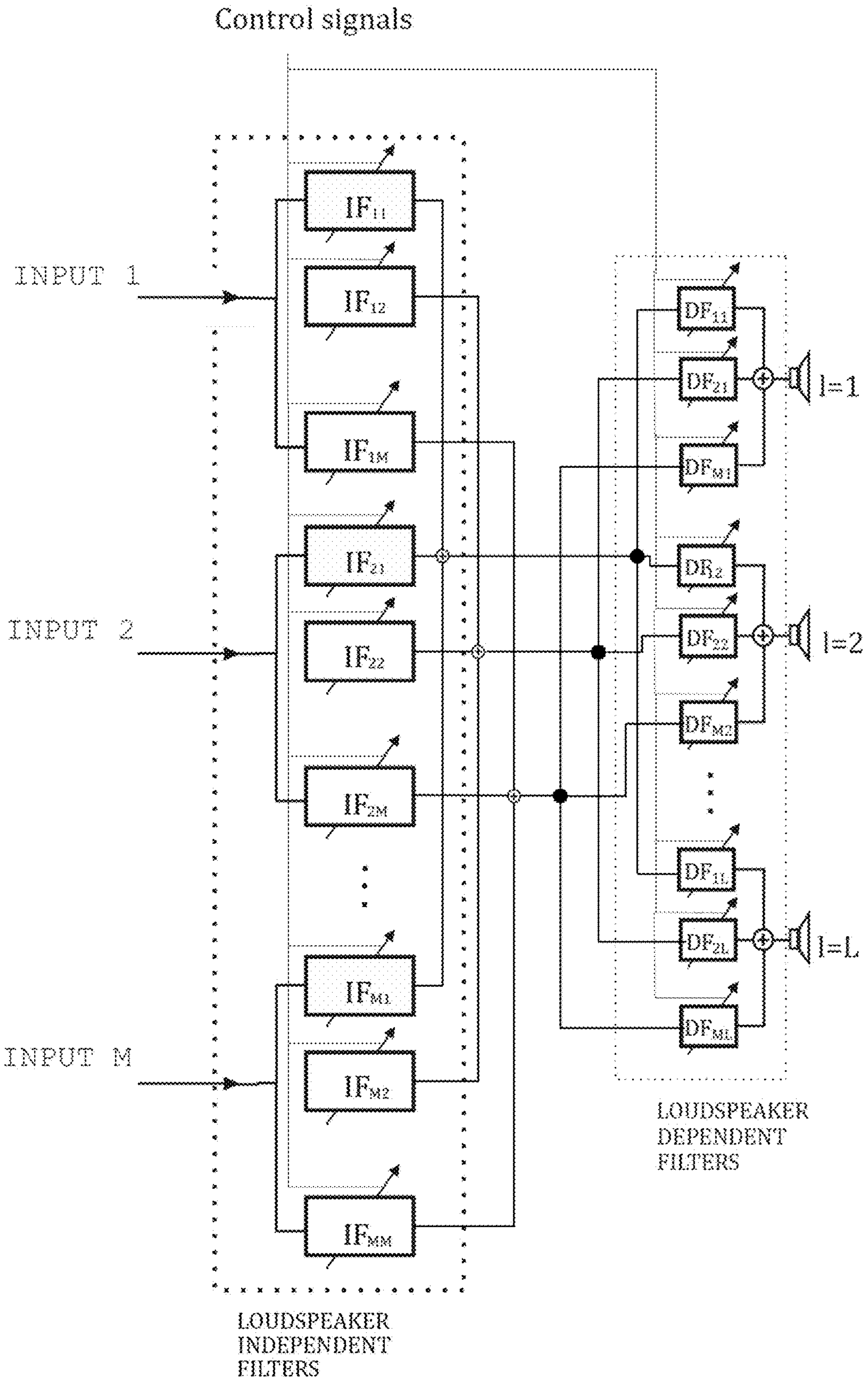
FIG. 8 shows an expanded signal processing diagram of Technology 1 filtering showing the M×M IFs and M×L DFs.

FIG. 8 shows an expanded signal processing diagram of Technology 1 filtering showing the M×M IFs and M×L DFs.

Figure 7:
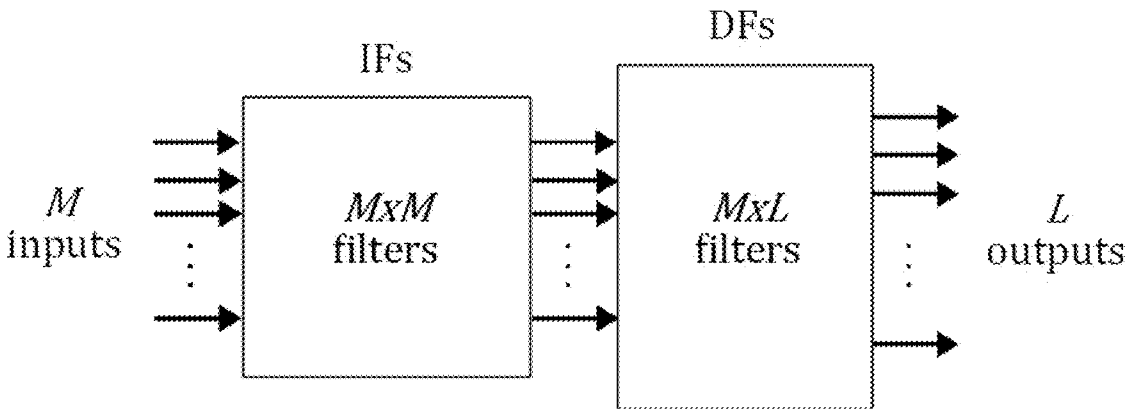
FIG. 7 shows a simplified signal processing diagram of Technology 1 filtering to reproduce M input signals with L loudspeakers.

An alternative signal flow to the state of the art MIMO theory is to implement $(GG^H+A)^{-1}$ (with some modelling delay) as a bank of M×M filters, hereafter referred to as Independent Filters (IFs), and $G^H$ (also with added modelling delay) as a bank of M×L filters, referred as Dependent Filters (DFs) and which are generally simpler to compute and implement than the Independent Filters. FIG. 7 reports a block diagram of this signal processing architecture and FIG. 8 shows an expanded view to see the detail of the IFs and the DFs. This alternative implementation has the advantage of reducing the CPU consumption to filter a given amount of digital data.

Key Features of the Approach of the Present Disclosure

Generalisation for MIMO Systems

The considerations made in the previous section suggest that a strategy that eliminates or significantly reduces the non-causal pre-ringing in the impulse response of the inverse of $\det(GG^H+A)$ will significantly reduce the required amount of modelling delay and therefore the overall system latency.

For the sake of explanation, let us consider the geometry and variables introduced in the previous section. We subdivide the loudspeaker array in M subsets. Each subset $\mathcal{L}_m$ is associated to the m-th control point, see example in FIG. 9 for a loudspeaker array controlling the acoustic pressure at M=2 points. We will discuss later the criterion by which given loudspeaker belongs to a given set or not.

Figure 9:
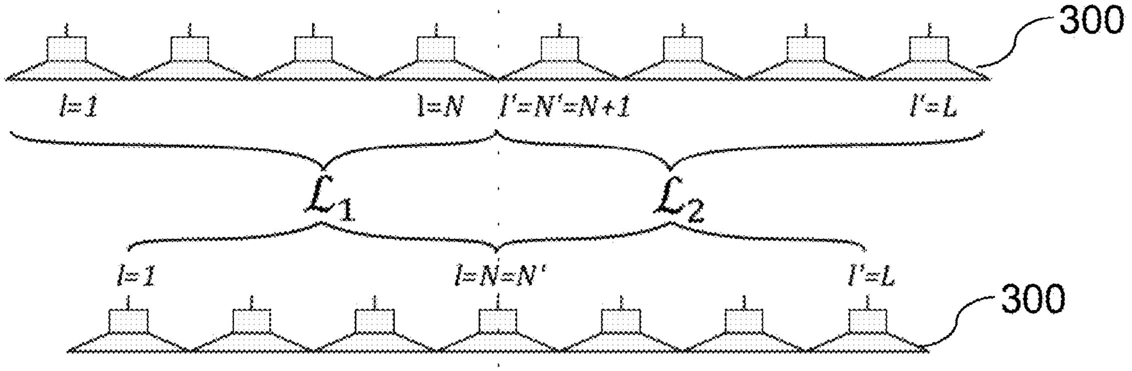
FIG. 9 illustrates a division of an array of L speakers into two speaker sets $\mathcal{L}$ and $\mathcal{L}$.

FIG. 9 illustrates a division of an array of L speakers into two speaker sets $\mathcal{L}_1$ and $\mathcal{L}_2$.

After having created the M loudspeaker sets $\mathcal{L}_m$ we create an auxiliary matrix $\tilde{G}$ given by $$\tilde{G}=G\odot\Gamma \tag{4}$$

where $\odot$ represents the element-wise (Hadamard) product and $\Gamma$ is a 2×L activation matrix whose coefficients are $$\Gamma_{m,\ell}=\begin{cases}1 & \text{if } \ell\in\mathcal{L}_m\\ 0 & \text{otherwise}\end{cases} \tag{5}$$

The activation matrix sets to zero the elements in each row m of G that do not belong to the set $\mathcal{L}_m$, associated to that row.

In the case of two control points, for example, if the loudspeakers are ordered such that loudspeakers 1, 2, . . . , N belong to $\mathcal{L}_1$ and speakers N, N+1, . . . , L belong to $\mathcal{L}_2$ (note that, in this case, the N-th speaker belongs to both sets), matrix $\tilde{G}$ is of the form $$\tilde{G}=\begin{bmatrix}G_{1,1} & \dots & G_{1,N-1} & G_{1,N} & 0 & \dots & 0\\ 0 & \dots & 0 & G_{1,N} & G_{1,N+1} & \dots & G_{1,L}\end{bmatrix} \tag{6}$$

The filters can then be designed on the basis of the following equation:

$$H=e^{-j\omega T}\tilde{G}^H(GG^H+A)^{-1} \tag{7}$$

where, as above, T is a modelling delay and A is a regularisation matrix.

Application to Technology 1

As for equation 2, this equation can be implemented as a bank of Independent Filters (IF) and a bank of Dependent Filters (DF), such that $$\mathrm{DF}=e^{-j\omega T_1}\tilde{G}^H \tag{8}$$

$$\mathrm{IF}=e^{-j\omega T_2}(G\tilde{G}^H+A)^{-1} \tag{9}$$

note that, in order to ensure causality of both sets of filters, the modelling delay has now been split into two terms $T_1$ and $T_2$ such that $T_1+T_2=T$.

Figure 10:
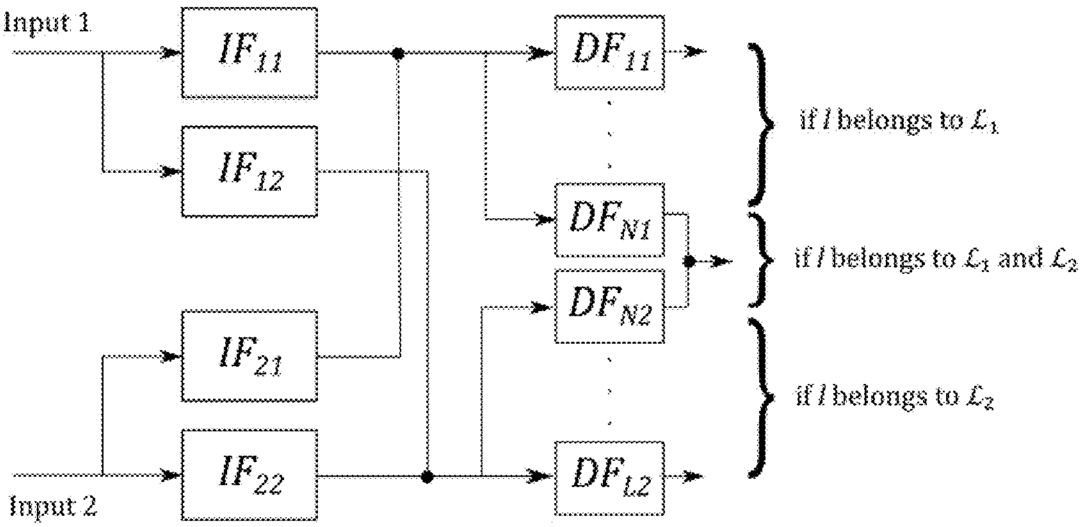
FIG. 10 illustrates a signal processing scheme in accordance with the present disclosure, controlling the acoustic pressure at M=2 control points—note that in this example $T_1$=0.
Figure 11:
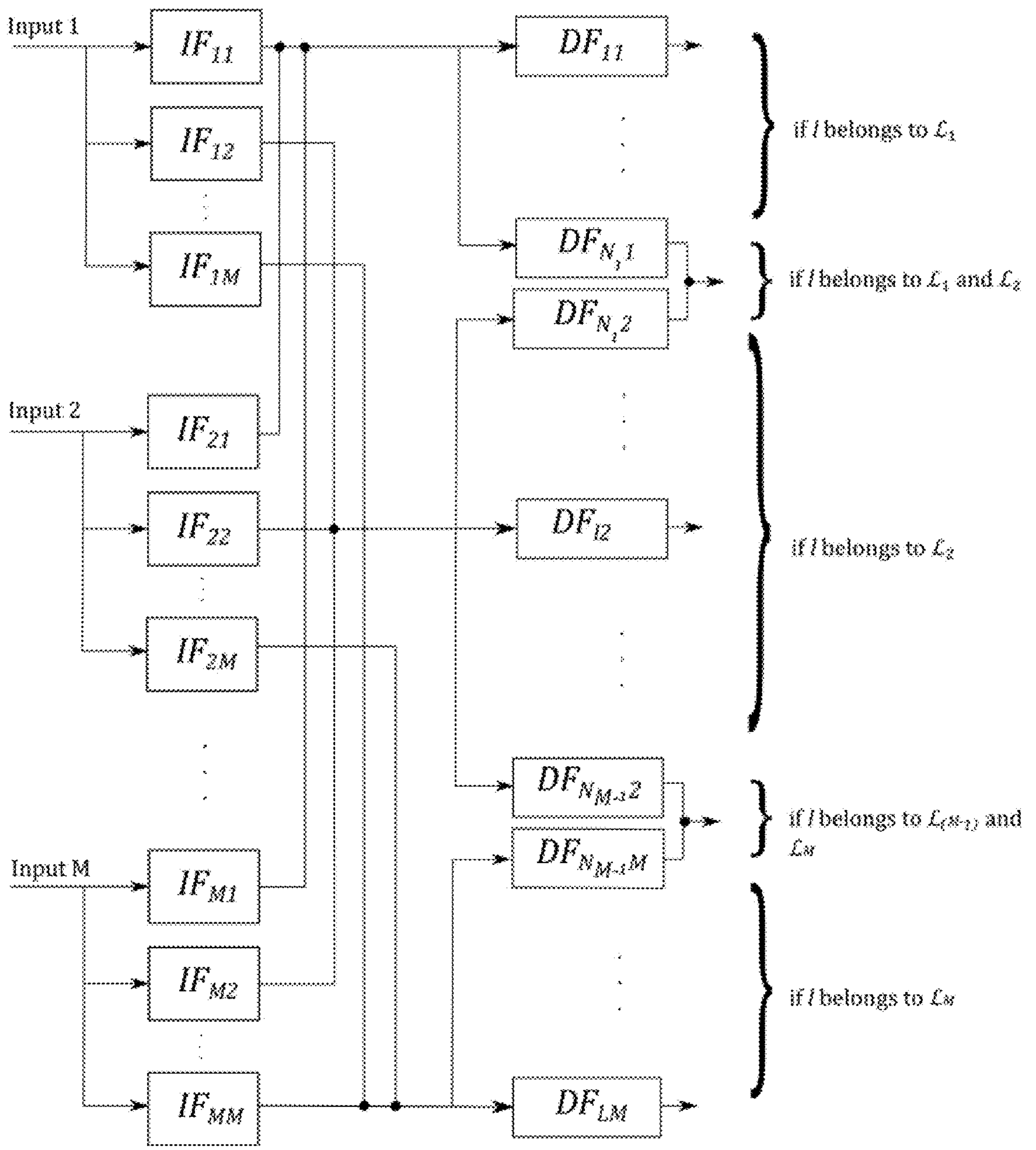
FIG. 11 illustrates a generalised signal processing scheme in accordance with the present disclosure using a "Technology 1" processing scheme controlling the acoustic pressure at a set of M>2 control points.

FIG. 10 shows the block diagram of the proposed implementation for the case of M=2. The approach of the present disclosure can also be applied for systems controlling the acoustic pressure at multiple points. To this end, a generalised signal block diagram for a multipoint system (M>2) can be used, as shown in FIG. 11. A comparison of this figure with the original Technology 1 scheme, see FIG. 8, shows that for the Technology 1 scheme each of the M outputs of the Independent Filter banks feeds each loudspeaker of the system (after having been filtered by the relevant Dependent Filters), whereas in the case of FIG. 11, representing the approach of the present disclosure, the m-th output of the Independent Filters feeds only the loudspeakers of the corresponding group $\mathcal{L}_m$.

FIG. 10 illustrates a signal processing scheme in accordance with the present disclosure, controlling the acoustic pressure at M=2 control points—note that in this example $T_1=0$.

FIG. 11 illustrates a generalised signal processing scheme in accordance with the present disclosure using a "Technology 1" processing scheme controlling the acoustic pressure at a set of M>2 control points.

To gain a better understanding of the approach of the present disclosure, consider the diagram in FIG. 10 in the case of two control points (M=2) and when the target signal is $d=[1, 0]^T$, that is an ideal pulse at the first control point and no sound at the second control point. After the Independent Filters stage, the loudspeakers of subset $\mathcal{L}_1$ will create a sound beam to deliver the target signal to control point 1, whereas the loudspeakers of subset $\mathcal{L}_2$ will create a sound beam that cancels any "leakage" of the beam created by $\mathcal{L}_1$ to control point 2. The speakers of $\mathcal{L}_1$ will also cancel the "leakage" of the beam created by $\mathcal{L}_2$ to control point 1.

It is important to clarify that the approach of the present disclosure not only covers the DSP implementation as described in FIG. 10 but also any other signal processing scheme associated with the M×L filter bank or any other implementation that can be represented by equation 7.

PERFORMANCE EXAMPLES

To demonstrate the effect of this approach, let us again consider the control geometry with a loudspeaker array of L loudspeakers and M=2 pressure control points. The loudspeakers can be divided in various ways. As shown in FIG. 9, loudspeakers 1 to N or N+1 belong to group $\mathcal{L}_1$ whereas loudspeakers N or N+1 belong to group $\mathcal{L}_2$.

Figure 12:
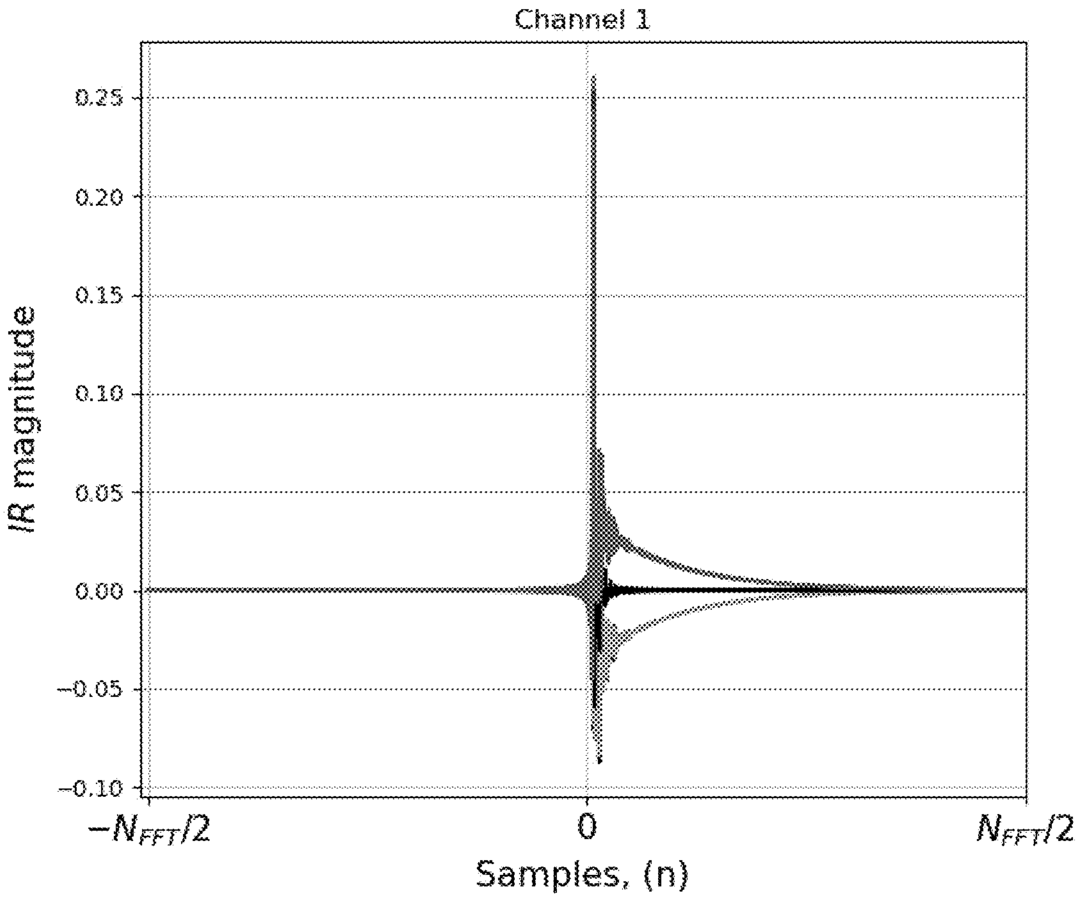
FIG. 12 shows loudspeaker array filters calculated according to Eq. 7 for a system having M=2 control points.

FIG. 12 shows loudspeaker array filters calculated according to Eq. 7 for a system having M=2 control points.

FIG. 12 shows the impulse responses of the filters H, designed with equation 7, without modelling delay, i.e., T=0.

Figure 13A:
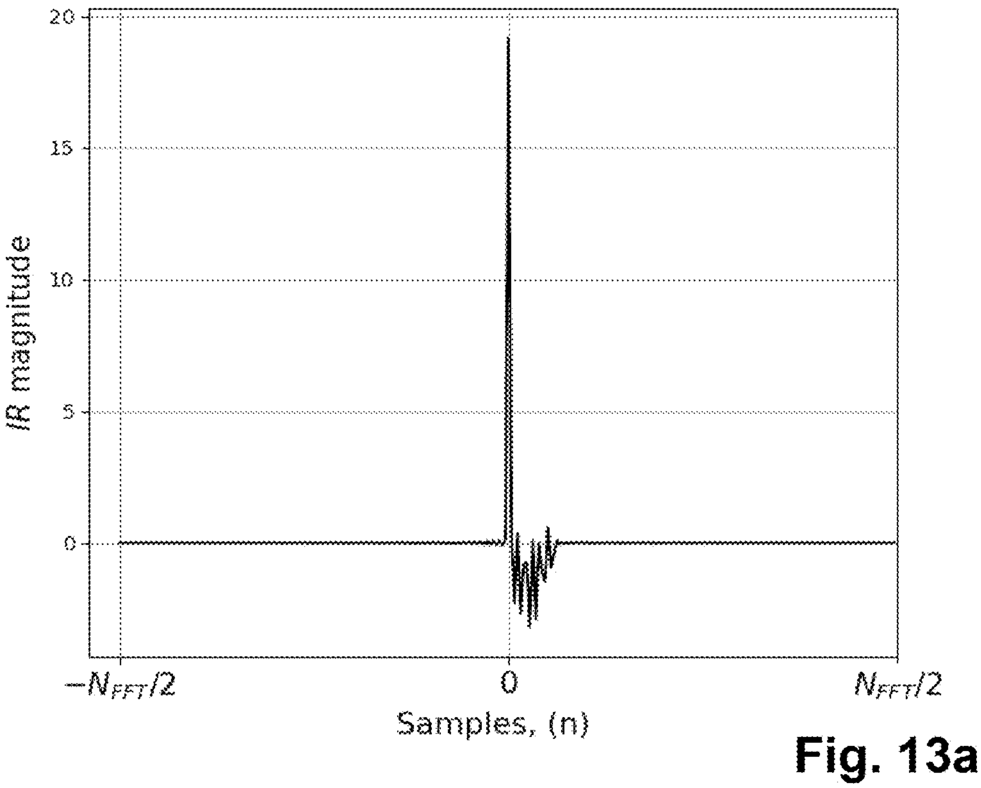
FIGS. 13*a* and 13*b* show impulse responses of the determinant (FIG. 13*a*) and the determinant inverse (FIG. 13*b*) for a multi-speaker system controlling the acoustic pressure at two control points according to the present disclosure—it can be observed how both responses are completely causal and do not need a modelling delay.
Figure 13B:
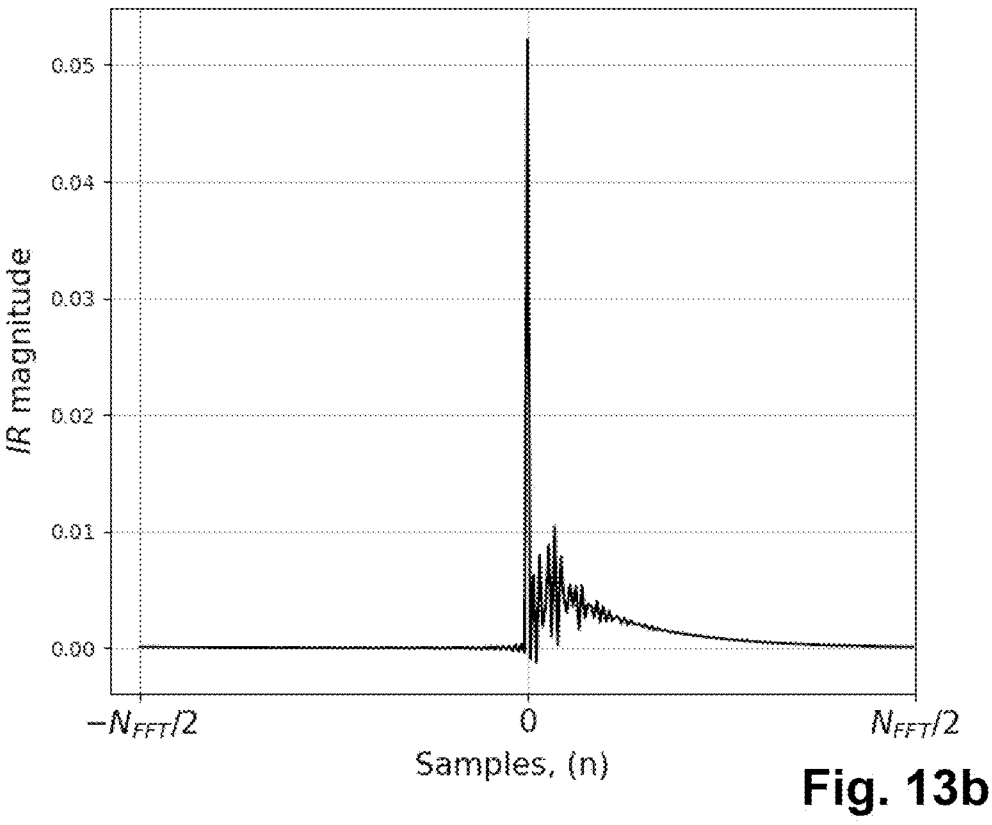

FIGS. 13*a* and 13*b* respectively show the impulse response of $\det(G\tilde{G}^H+A)$ and its inverse. It can be clearly seen that the impulse response of the determinant and of its inverse are causal and the pre-ringing has disappeared.

Figure 14:
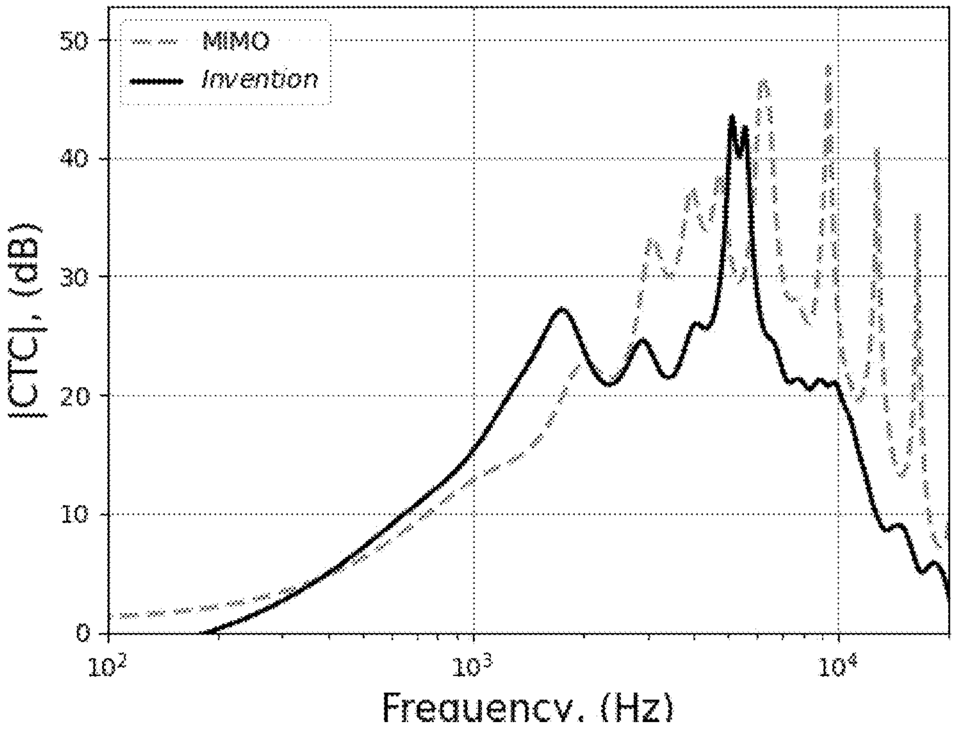
FIG. 14 illustrates reproduced cross-talk cancellation for a single listener comparing a MIMO system (filters calculated according to Eq. 2) with the approach of the present disclosure (filters calculated according to Eq. 7)

The performance of a system with filters created according to the approach of the present disclosure is shown in FIG. 14. The example includes a system operating in cross-talk cancellation (CTC) mode and filters are created to maximise the pressure difference between both of the ears of a listener. The figure shows the cross-talk cancellation (CTC) spectrum, which is defined as the channel pressure difference between the acoustic pressure at the ears of a listener $$CTC=20\log_{10}\left(\frac{p_1}{p_2}\right), \tag{10}$$

which is a dimensionless quantity measured in dB. The results of FIG. 14 show how the approach of the present disclosure is able to obtain a CTC spectrum similar to that obtained if using state of the art MIMO filters.

FIG. 14 illustrates reproduced cross-talk cancellation for a single listener comparing a MIMO system (filters calculated according to Eq. 2) with the approach of the present disclosure (filters calculated according to Eq. 7).

Figure 15:
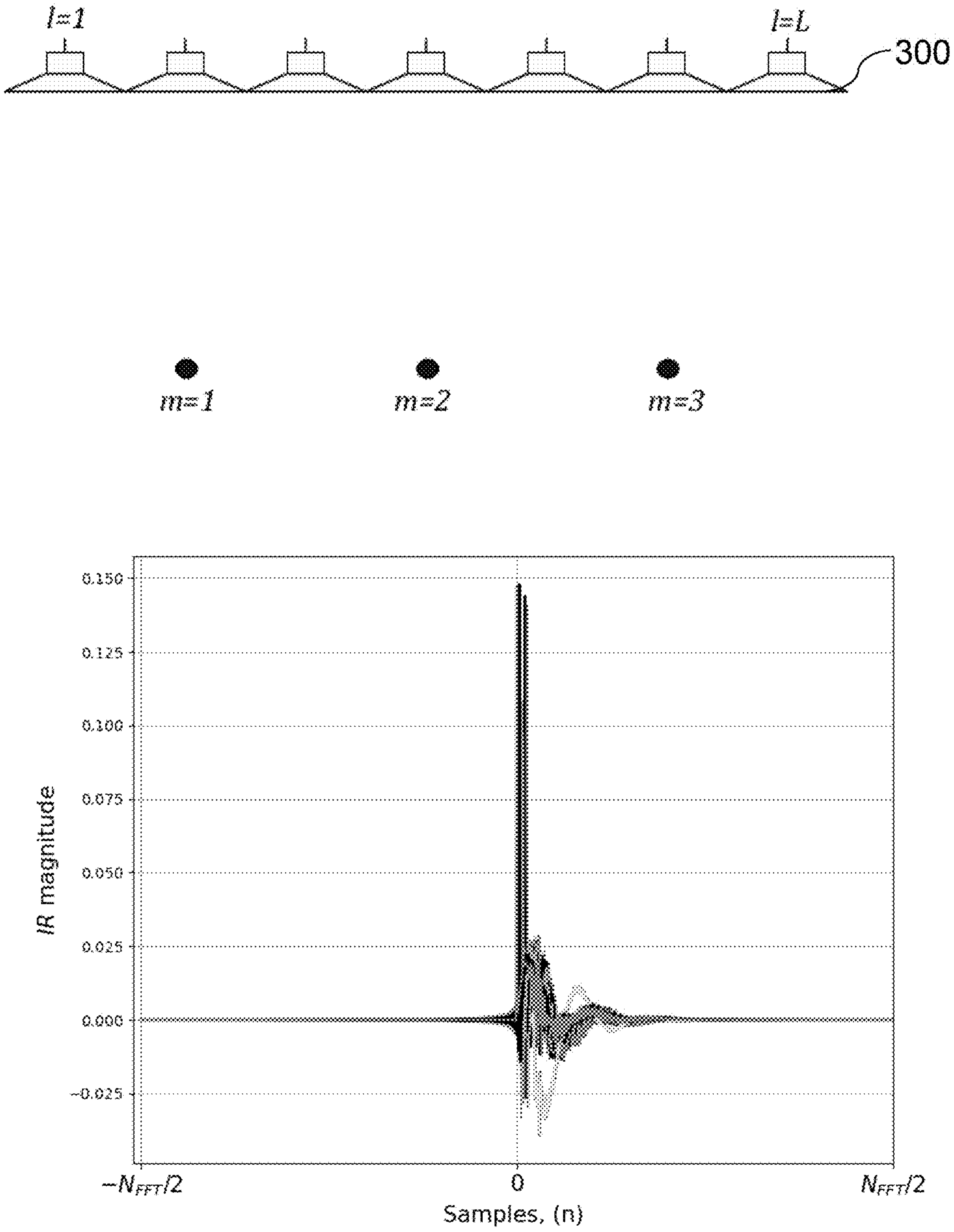
FIG. 15 illustrates a control geometry for a system controlling the acoustic pressure at M=3 points and corresponding array filters calculated according to the approach of the present disclosure Eq. 7.

FIG. 15 illustrates a control geometry for a system controlling the acoustic pressure at M=3 points and corresponding array filters calculated according to the approach of the present disclosure Eq. 7.

The example is considered that includes more than M=2 control points and the geometry shown in FIG. 15. The top plot of FIG. 15 shows a geometry of a loudspeaker array having M=3 control points, and the bottom plot of FIG. 15 shows its control filters. The same conclusions as in the case M=2 can be drawn in terms of the impulse responses and their causality.

Figure 16A:
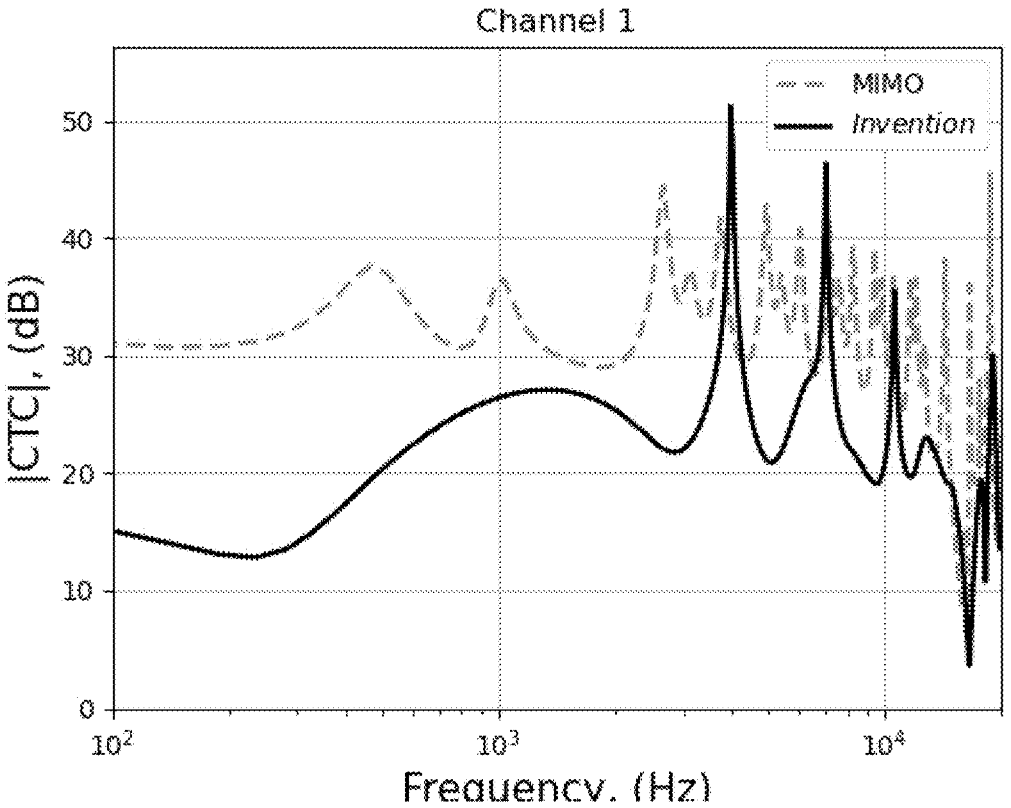
FIGS. 16*a*, 16*b* and 16*c* illustrate reproduced cross-talk cancellation for the three point control geometry of FIG. 15 comparing a MIMO system (filters calculated according to Eq. 2) with the approach of the present disclosure (filters calculated according to Eq. 7)
Figure 16B:
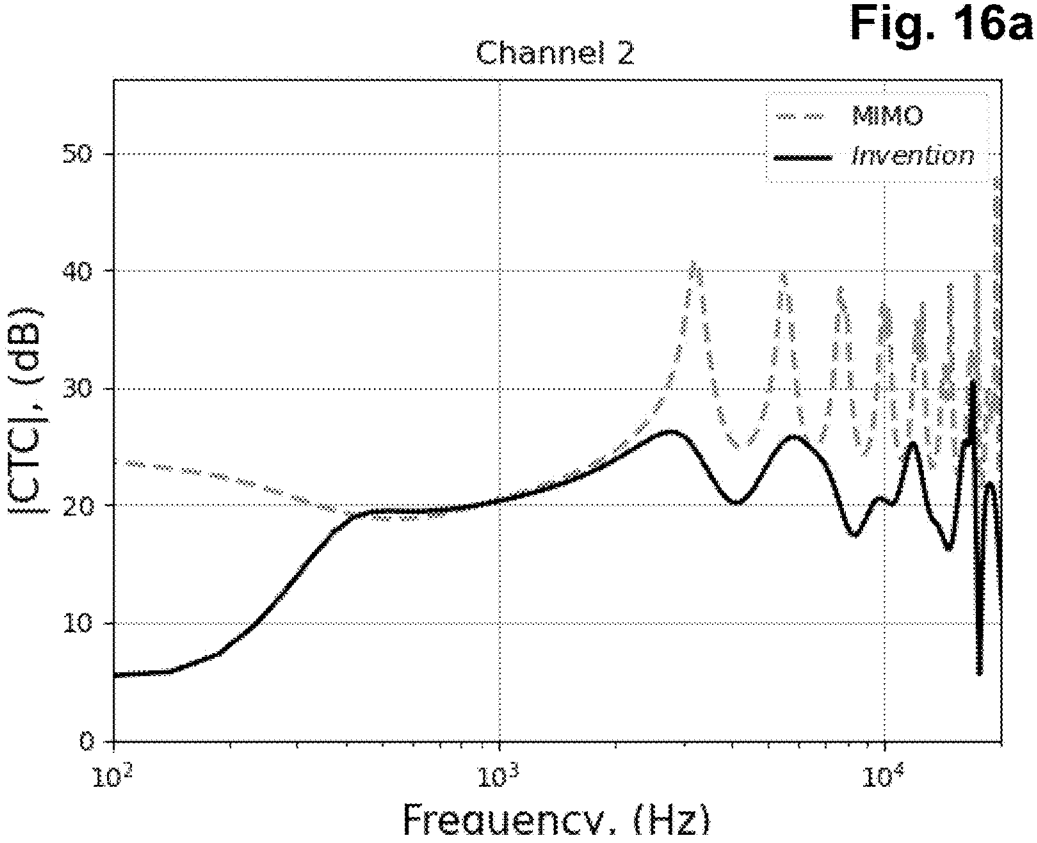
Figure 16C:
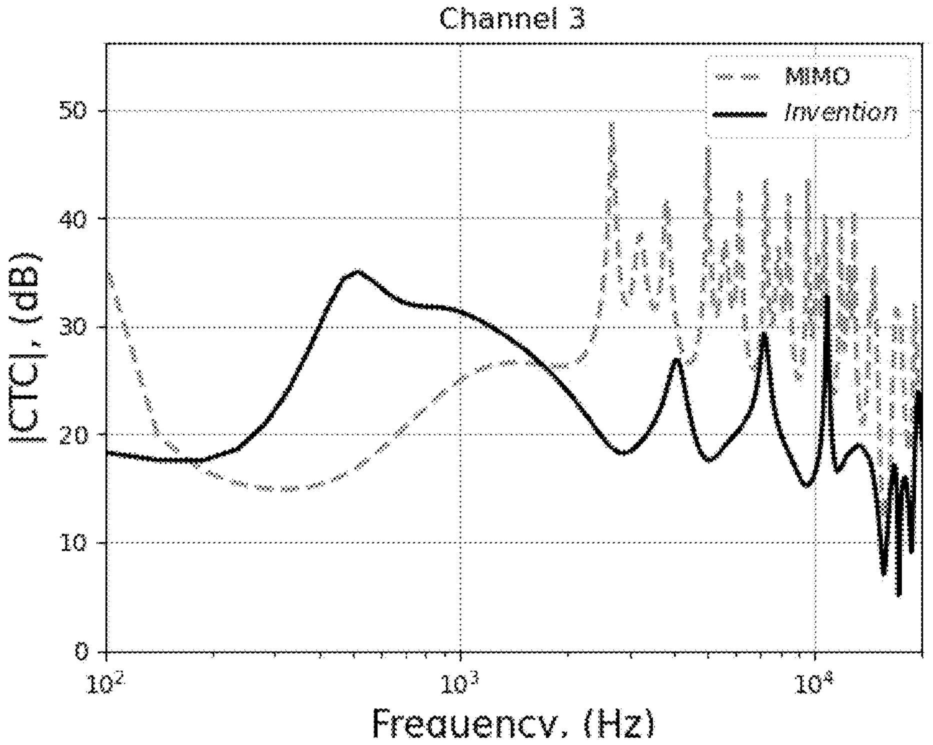

To check the validity of the approach of the present disclosure, performance results for the geometry of FIG. 15 are shown in FIGS. 16*a*, 16*b* and 16*c*. In this case, CTC is calculated as the channel pressure difference at the control point corresponding to the intended channel divided by the sum of the acoustic pressure at the rest of control points, $$CTC_m = 20\log_{10}\left(\frac{p_m}{\sum_{n=0}^{M} p(m \neq m)}\right). \tag{11}$$

The results of FIGS. 16*a*, 16*b* and 16*c* show how the performance of the presented formulation is comparable to that provided by the start of the art of the MIMO formulation.

In conclusion, the pre-ringing of the filters can be eliminated and the modelling delay significantly reduced if the filters are designed on the basis of equation 7 and with the appropriate definition of the loudspeaker groups $\mathcal{L}_m$.

Definition of Loudspeaker Sets: Option 1

One option is to assign each loudspeaker $\mathcal{L}$ to a given subset $\mathcal{L}_m$, associated to the m-th control point, if that loudspeaker is "closer" to (or as close as) the control point m than any other control point.

Figure 17:
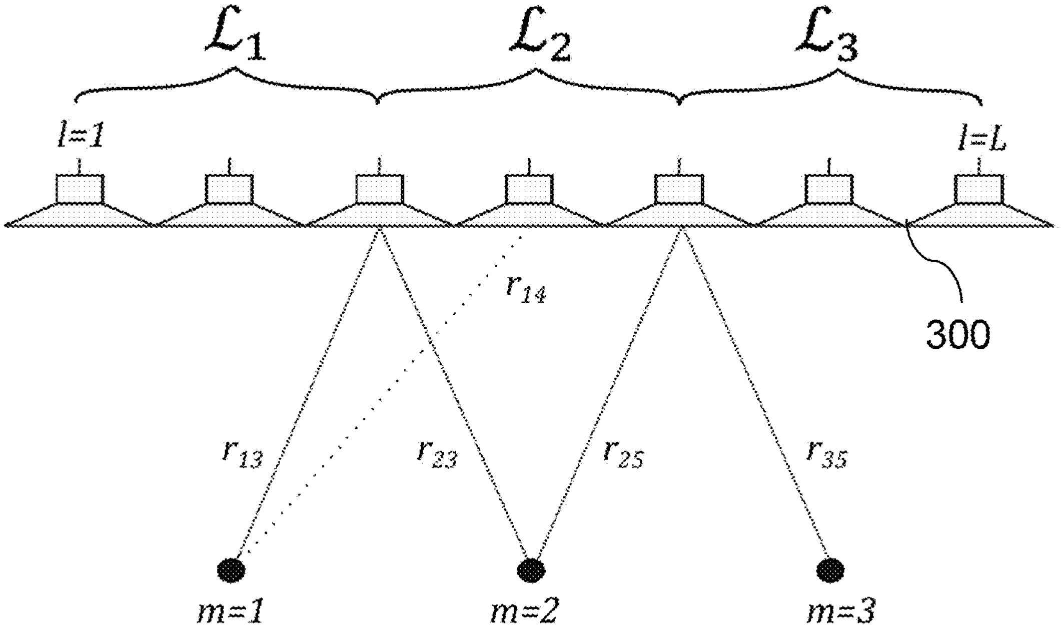
FIG. 17 illustrates an example of loudspeaker group selection for a multi-control point system.

FIG. 17 illustrates an example of loudspeaker group selection for a multi-control point system.

The concept of "close" is defined by a distance factor $r_m\mathcal{L}$. The latter can be defined either as the geometrical distance between the $\mathcal{L}$-th loudspeaker and the m-th control point, i.e. $r_m\mathcal{L} = \|x_m - y_\ell\|$, of the acoustic path between said loudspeaker and control points. The two definitions are identical in case of sound propagating in the free-field (i.e. no acoustic diffraction). Thus, this first criterion to define whether a given loudspeaker with index $\mathcal{L}$ belongs to a given set $\mathcal{L}_m$ is mathematically defined as:

$$\mathcal{L} \in \mathcal{L}_m \Leftrightarrow r_{ml} \leq r_{nl}\, \forall n \neq m \tag{12}$$

To have an easier understanding, see example of FIG. 17. In this case, $r_{13}$ is equal in length to radius $r_{23}$, but radius $r_{14}$ is longer. This way, the speakers are distributed so that $\mathcal{L}_{(1<<3)} \in \mathcal{L}_1$, $\mathcal{L}_{(3<<<5)} \in \mathcal{L}_2$ and $\mathcal{L}_{(5<l<L)} \in \mathcal{L}_3$.

The rationale for that choice is that, under the assumption that the loudspeakers are ideal monopole sources radiating in free field, the elements of matrix G are of the form $$G_{m\ell} = \frac{e^{-j\omega r_{m\ell}/c_0}}{4\pi r_{m\ell}} \tag{13}$$

where $c_0$ is the speed of sound. The elements of $\Psi = G\tilde{G}^H + A$ (assuming again that A is diagonal and real-valued) are of the form $$\Omega_{nm} = \sum_{\ell=1}^{L} \Gamma_{m\ell} \frac{e^{-j\omega(r_{n\ell} - r_{m\ell})/c_0}}{16\pi^2 r_{n\ell} r_{m\ell}} + A_{nm} \tag{14}$$

where the elements of matrix Γ are as defined in equation (5). In the light of equation 12 it is clear that all terms of the sum are either delays (if $\mathcal{L} \in \mathcal{L}_m$) or are equal to zero (if l∉ $\mathcal{L}_m$). This in turn implies that all terms of matrix Ψ correspond to causal filters—this is not the case with the conventional filter design (eq 2). Also its determinant can be represented as a causal filter, as it is given by a linear combination of the product (in the frequency domain) of causal filters.

The causality of the determinant is not sufficient to ensure the causality of its inverse. The determinant should also be a minimum phase filter. Whereas this is difficult to prove mathematically, practice shows that, when designing the filters with the method proposed here, the determinant is a minimum phase filters (i.e. all its zeros are within the unit circle) for a large variety of cases of practical relevance.

The same criterion to assign loudspeakers to a given group could be extended to the case when a given loudspeaker group is assigned to more than one control point (a group of control points). In this case, a reference control point is defined for each group of control points. This reference control point could coincide with one of the control points in that group, or could be an additional control point created for the sole purpose of assigning loudspeakers to groups (e.g., a centroid of the control points in the group). With this in mind, a loudspeaker with index $\ell$ is assigned to a group $\mathcal{L}_\nu$ based on the following equation:

$$\ell \in \mathcal{L}_\nu \Leftrightarrow r_{\nu\ell} \leq r_{\mu\ell},\ \forall \nu \neq \mu$$

where $r_{\nu\ell}$ (and $r_{\mu\ell}$) is the distance from the $\ell$-th loudspeaker to the reference control point of the ν-th group (or μ-th group) of control points. In this case, ν could be group 1 and μ could be group 2.

This operation allows for loudspeaker groups to be associated to more than one control points and, in many practical cases, it also ensures that all loudspeakers in a given loudspeaker group are closer to all control points associated to that group than to control points associated to different groups, but reduces the computational cost required for assigning loudspeakers to groups. In this case, the causality of the filters may not always be ensured, but still the latency of the system may be reduced significantly if the position of the reference control points is chosen wisely.

One practical example where this option of assigning more than one control point to one group may be useful is given by the case when the system is supposed to deliver independent signals to multiple listeners, and each listener is associated to two or more control points (for example, the position of their ears) and those two or more control points are in turn associated to one loudspeaker group. The reference control point associated to each group can be, for example, the centre of the head of the given listener.

Definition of Loudspeaker Sets: Option 2

In case of 2 control points a different option can be chosen for the definition of the loudspeaker sets.

Firstly, we define the path difference $$\Delta_\ell = r_{2\ell} - r_{1\ell} \tag{15}$$

We then split the loudspeakers into the two sets such that $$\Delta_\ell \geq \Delta_{\ell'}\ \forall \ell \in \mathcal{L}_1 \text{ and } \forall \ell' \in \mathcal{L}_2 \tag{16}$$

Namely, the path difference of any loudspeakers in subset 1 should be greater than, or equal to the path difference of any loudspeaker in subset 2. Note that criterion (12) (Option 1) being satisfied implies that (16) is satisfied, but the opposite is not true. This means that criterion (12) is a stricter condition than criterion (16).

To understand the rationale of this criterion, we observe that, under the same assumption as in the previous section (i.e. equation 13), the determinant of $(G\tilde{G}^H+A)$ is of the form $$\det\left(G\tilde{G}^H + A\right) = D\left[1 - \sum_{\ell=1}^{L}\sum_{\ell'=1}^{L} B_{\ell,\ell'}\ \Gamma_{1\ell}\Gamma_{2\ell'}\ e^{-j\omega(\Delta_\ell-\Delta_{\ell'})/c_0}\right] \tag{17}$$

$$D = \sum_{\ell=1}^{L}\sum_{\ell'=1}^{L}\left[\frac{\Gamma_{1\ell}}{(4\pi r_{1\ell})^2} + A_{1,1}\right]\left[\frac{\Gamma_{2\ell'}}{\left(4\pi^2 r_{2\ell'}\right)^2} + A_{2,2}\right] \tag{18}$$

$$B_{\ell,\ell'} = \frac{1}{D(4\pi)^2 r_{1\ell} r_{2\ell'}} \tag{19}$$

where D and $B_{\ell\ell'}$ are real, frequency independent numbers (their exact definitions, eq. 18 and 19, are not particularly important for the sake of the approach of the present disclosure). If the loudspeaker subsets (i.e. matrix Γ, as defined in equation (5)) have been defined to satisfy condition (16), the arguments of the exponentials in equation (17) will always have zero real part and negative or zero imaginary part. As a consequence of that, the inverse of the determinant has an input-output time-domain relation of the form $$y(t) = D^{-1}x(t) + \sum_{\ell,\ell'} B_{\ell,\ell'}\ y\left[t - (\Delta_\ell - \Delta_{\ell'})/c_0\right] \tag{20}$$

which is clearly a causal relation if condition (16) is satisfied.

The stability of $[\det(G\tilde{G}^H+A)]^{-1}$ is ensured by the Cauchy-Schwarz inequality, by which $$\det(G\tilde{G}^H+A)=(\tilde{g}_1^H g_1+A_{1,1})(\tilde{g}_2^H g_2+A_{2,2})-(\tilde{g}_1^H g_2)(\tilde{g}_2^H g_1)\geq 0 \tag{21}$$

$\tilde{g}_1$ and $\tilde{g}_2$ (and $g_1$, $g_2$) are the first and second row of matrix G (and G). The strict inequality holds if $A_{1,1}, A_{2,2}>0$ or if the pairs $\tilde{g}_1$, $g_2$ and $\tilde{g}_2$, $g_1$ are linearly independent. The latter condition will in general be true since some of the entries of $\tilde{g}_1$ are zero whereas the corresponding elements of $g_2$ are not (or equivalently for $\tilde{g}_2$ and $g_1$).

In summary, this second condition will ensure that the inverse determinant $[\det(G\tilde{G}^H+A)]^{-1}$ corresponds to a causal and stable filter, which therefore no longer needs to be approximated by an FIR with a long modelling delay.

Consideration on Loudspeaker Signals

Considering a given set of control points M with loudspeakers divided into a set of M groups. According to Eq. 3, it is possible to define the adjoint matrix B with size M×M so that $$B=\operatorname{adj}(G\tilde{G}^H+A), \tag{22}$$

with elements $B_{nm}$. For a given set of M input binaural signals $d=[d_1, d_2, \ldots, d]^T$, the signal driving a loudspeaker that belongs to the subset $\mathcal{L}_m$ (and to no other subset) is given by $$q_\ell = \frac{e^{-j\omega T}}{\det\left(G\tilde{G}^H + A\right)}\left[\hat{G}^*_{m,\ell}(d_1 B_{m,1} + d_2 B_{m,2} + \cdots + d_M B_{m,M})\right] \tag{23}$$

In case of ideal monopoles propagating in free-field, i.e. eq. 13, this becomes $$q_\ell = \frac{e^{j\omega(T-r_{m,\ell}/c_0)}}{\det\left(G\tilde{G}^H + A\right)4\pi r_{1\ell}}(d_1 B_{m,1} + d_2 B_{m,2} + \cdots + d_M B_{m,M}) \tag{24}$$

If the loudspeaker belongs to two subsets $\mathcal{L}_m$ and $\mathcal{L}_{m+1}$ the loudspeaker signal becomes $$q_\ell = \frac{e^{-j\omega T}}{\det\left(G\tilde{G}^H + A\right)}\left[\hat{G}^*_{m,\ell}(d_1 B_{m,1} + d_2 B_{m,2} + \cdots + d_M B_{m,M}) + \left[\hat{G}^*_{m+1,\ell}(d_1 B_{m+1,1} + d_2 B_{m+1,2} + \cdots + d_M B_{m+1,M})\right]\right. \tag{25}$$

and in case of ideal monopoles in free field $$q_\ell = \frac{1}{\det\left(G\tilde{G}^H + A\right)}\left[\frac{e^{-j\omega(T-r_{m,\ell}/c_0)}}{4\pi r_{1\ell}}(d_1 B_{m,1} + d_2 B_{m2} + \cdots + d_M B_{m,M}) + \frac{e^{-j\omega(T-r_{m+1,\ell}/c_0)}}{4\pi r_{1\ell}}(d_1 B_{m+1,1} + d_2 B_{m+1,2} + \cdots + d_M B_{m+1,M})\right] \tag{26}$$

As a consequence of equations 24, under free-field assumptions all signals feeding the speakers that belong to the same subset $\mathcal{L}_m$ (with the possible exception of single speakers that belong to two groups) are identical apart from a gain and a delay that are loudspeaker dependent. In practice, this effect can also be observed in filters created using other plant transfer functions different from free-field.

In the case of a system using the Technology 1 DSP architecture, the loudspeaker signals for a speaker belonging only to speaker set $\mathcal{L}_m$ are $$q_\ell = \mathrm{DF}_{\ell,m}(d_1\mathrm{IF}_{1,m}+d_2\mathrm{IF}_{2,m}+ \ldots +d_m\mathrm{IF}_{M,m}). \tag{27}$$

In the case that one loudspeaker belongs to both speaker sets $\mathcal{L}_m$ and $\mathcal{L}_{m+1}$ the loudspeaker signals are $$q_\ell = \mathrm{DF}_{\ell,m}(d_1\mathrm{IF}_{1,m}+d_2\mathrm{IF}_{2,m}+ \ldots +d_m\mathrm{IF}_{M,m})+\mathrm{DF}_{\ell,m+1}(d_1\mathrm{IF}_{1,m+1}+d_2\mathrm{IF}_{2,m+1}+ \ldots +d_m\mathrm{IF}_{M,m+1}). \tag{28}$$

Effect of Acoustic Diffraction

Figure 18A:
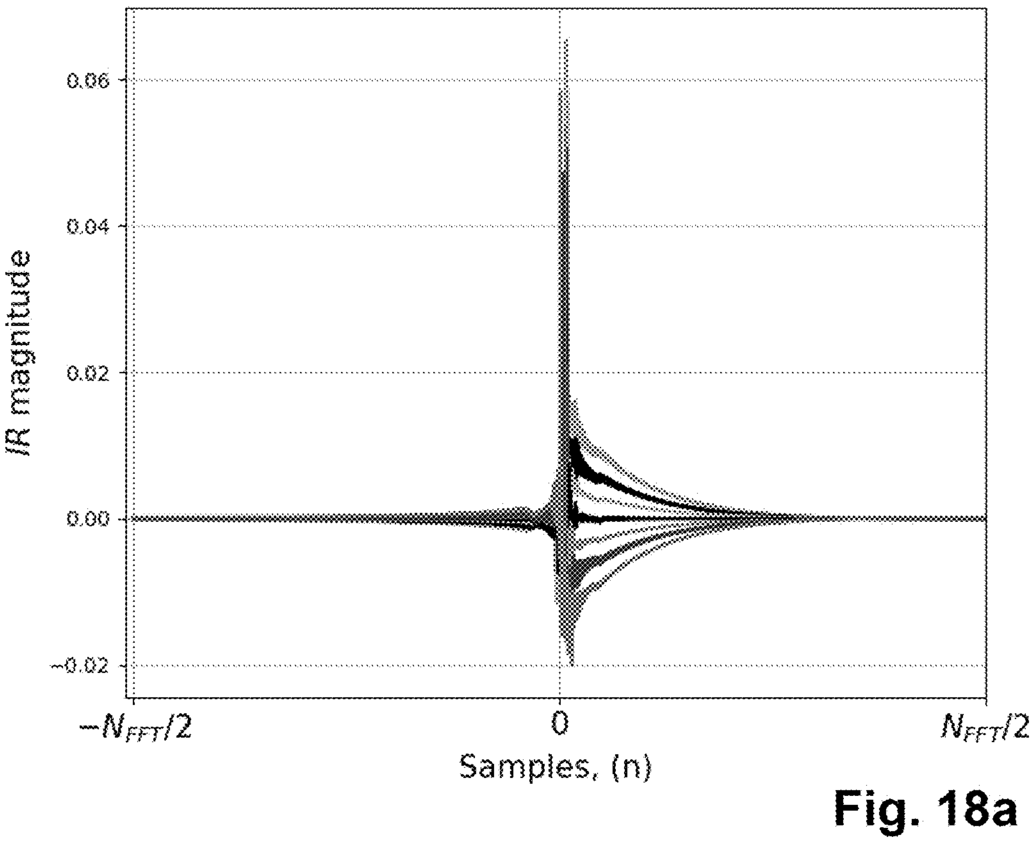
FIGS. 18*a* and 18*b* shows impulse response FIG. 15 comparing a MIMO system (filters calculated according to Eq. 2) with the approach of the present disclosure (filters calculated according to Eq. 7)
Figure 18B:
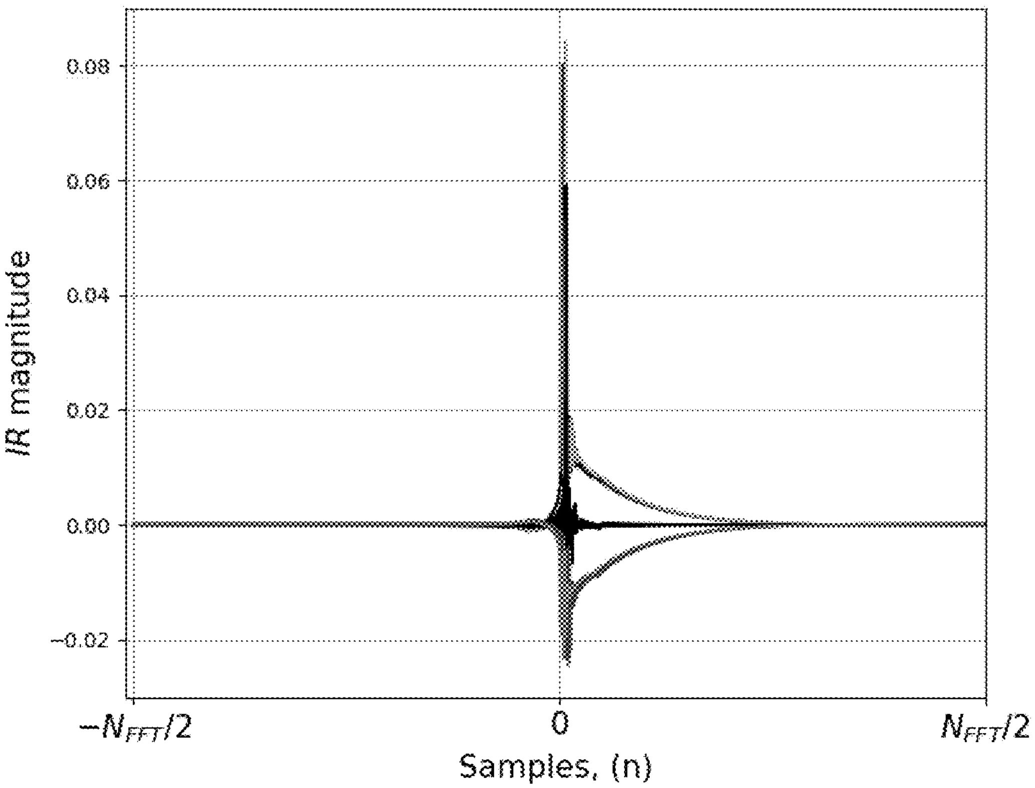

FIGS. 18*a* and 18*b* shows impulse response FIG. 15 comparing a MIMO system (filters calculated according to Eq. 2) with the approach of the present disclosure (filters calculated according to Eq. 7).

The proof above where given for the case where the plant matrix G is defined under the assumption that the loudspeakers are ideal monopoles (with a "flat" frequency response) radiating in free-field, and thus neglecting any effect of acoustic diffraction (ref. eq. 13). This may be relevant especially in the case of cross-talk cancellation, where the control points correspond to the ears of one of more listeners, and the scattering effect of the human head may not be negligible. It can be observed that the elements on the diagonal of $\tilde{G}^H G$ represent the sum of auto-spectra of transfer functions of all the loudspeaker of a given subset $\mathcal{L}_m$ to the corresponding control point $x_m$. Those auto-spectra are, by definition, real-valued, i.e. zero-phase. If the transfer functions do not have a "flat" frequency response then the inverse Fourier transform of their auto-spectra, their auto-correlation functions, will be symmetric non-causal signals. This in turn implies that, in general, it cannot be guaranteed that the determinant of $(GG^H+A)$ can be represented as a causal filter, as in the case of free field shown above.

An example is shown in FIGS. 18*a* and 18*b*, where filters have been created using the general MIMO signal flow (filters calculated according to Eq. 2) with the approach of the present disclosure (filters calculated according to Eq. 7) using the transfer function of a rigid sphere propagation model. The results show that in this case, the design of the filters disclosed herein allows for a significant reduction of the pre-ringing of the filters caused by the inverse determinant. Hence the proposed approach can be successfully applied also in non-ideal free-field cases.

Variations—Filter Design with Weighted Norm

If we neglect the regularisation matrix A, the conventional filter design approach based on eq. 2 can be interpreted as the solution of the constrained optimisation problem $$\text{Minimise } \|Hd\|_2^2 \text{ subject to } GHd=e^{-j\omega T}d \tag{29}$$

which is a classical minimum $\ell^2$ norm solution. Noting that the latter is one of the infinite possible solutions of an underdetermined problem, the approach can be made more general by defining a weighted norm $$\|x\|_W^2=x^HWx \tag{30}$$

where W is a real-valued diagonal matrix, which, in the case under consideration, applies different penalty (weight) to different loudspeakers when computing the solution. In this case equation 2 becomes $$H=e^{-j\omega T}W^{-1}G^H(GW^{-1}G^H+A)^{-1} \tag{31}$$

This weighted-norm approach can be extended straightforwardly to the approach of the present disclosure. In this case, after having reintroduced the regularisation matrix A, an alternative to equation 7 to be used to design the filters is $$H=e^{-j\omega T}W^{-1}\tilde{G}^H(GW^{-1}\tilde{G}^H+A)^{-1} \tag{32}$$

Variations—Technology 2 Architecture

The approach presented herein can be applied also to a 'hybrid' signal processing architecture ('Technology 2'). In this case two models C and G of the plant matrix S are used. C is a simple model of the form $$C_{m\ell}=V_{m\ell}e^{-j\omega\tau_{m\ell}} \tag{33}$$

where $V_{m\ell}$ and $\tau_{m\ell}$ are a real-valued and frequency independent scalars. From a signal processing prospective, each element of C is therefore a product of a gain and a delay.

Matrix G is a generally more complex model of S, which may account for the loudspeaker response, acoustic diffraction, and other factors.

After having defined $$\tilde{C}=C\odot\Gamma \tag{34}$$

the filters can be computed on the basis of the following equation:

$$H=e^{-j\omega T}\tilde{C}^H(G\tilde{C}^H+A)^{-1} \tag{35}$$

Practice shows that causality and stability of the filters are granted provided the delay terms $\tau_{m\ell}$ are chosen wisely.

It is also possible to split the filters in dependent and independent filters, as in equations 8 and 9. In this case $$\text{DF}=e^{-j\omega T_1}\tilde{C}^H \tag{36}$$

$$\text{ID}=e^{-j\omega T_2}(G\tilde{C}^H+A)^{-1} \tag{37}$$

Considerations on Modelling Delays

The following considerations on the minimum required modelling delays assume G is free-field (eq. 13). They can, however, be extended to more general cases, even if approximately.

The elements of $\tilde{C}$ have delay terms of the form $e^{-j\omega(T_1-\tau_\ell)}$, hence the delay to ensure causality of the dependent filters should satisfy the relation $$T_1 \geq \tau_{max} = \max\left(\max_{\ell\in\mathcal{L}}\tau_{1,\ell},\ \max_{\ell'\in\mathcal{L}'}\tau_{2,\ell'}\right) \tag{38}$$

Note that this modelling delay does not have a significant impact on latency, since the minimum latency of a dependent filter (DF) is zero and the maximum latency is $\tau_{max}-\tau_{min}$. In practice, it may be convenient to choose $T_1=\max_{m,\ell}\tau_{m,\ell}$.

IF is a 2×2 matrix whose elements are $$IF_{1,1} = \frac{D^{-1}\left(\sum_{\ell'\in\mathcal{L}'}\left|C_{2,\ell'}\right|^2 + A_{2,2}\right)\ e^{-j\omega T_2}}{1-\sum_{\ell\in\mathcal{L},\ell'\in\mathcal{L}'}B_{\ell,\ell'}\ e^{-j\omega(\Delta_\ell-\Delta_{\ell'})}} \tag{39}$$

$$IF_{2,2} = \frac{D^{-1}\left(\sum_{\ell\in\mathcal{L}}|C_{1,\ell}|^2 + A_{1,1}\right)\ e^{-j\omega T_2}}{1-\sum_{\ell\in\mathcal{L},\ell'\in\mathcal{L}'}B_{\ell,\ell'}\ e^{-j\omega(\Delta_\ell-\Delta_{\ell'})}} \tag{40}$$

$$IF_{1,2} = \frac{-D^{-1}\sum_{\ell'\in\mathcal{L}'}V_{1,\ell'}V^*_{2,\ell'}e^{-j(T_2-\Delta_{\ell'})}}{1-\sum_{\ell\in\mathcal{L},\ell'\in\mathcal{L}'}B_{\ell,\ell'}\ e^{-j\omega(\Delta_\ell-\Delta_{\ell'})}} \tag{41}$$

$$IF_{2,1} = \frac{-D^{-1}\sum_{\ell\in\mathcal{L}}V^*_{1,\ell}V_{2,\ell}e^{-j(T_2-\Delta_\ell)}}{1-\sum_{\ell\in\mathcal{L},\ell'\in\mathcal{L}'}B_{\ell,\ell'}\ e^{-j\omega(\Delta_\ell-\Delta_{\ell'})}} \tag{42}$$

The minimum modelling delay should ensure that $$(T_2+\Delta_\ell)\geq 0,\ \forall\ell\in\mathcal{L} \text{ and } (T_2-\Delta_{\ell'})\geq 0,\ \forall\ell'\in\mathcal{L}' \tag{43}$$

and therefore $$T_2 \geq \max\left(-\min_{\ell\in\mathcal{L}}\Delta_\ell,\ \max_{\ell'\in\mathcal{L}'}\Delta_{\ell'},\ 0\right) \tag{44}$$

Given that $$\min_{\ell\in\mathcal{L}}\Delta_\ell = \Delta_N \text{ and } \min_{\ell'\in\mathcal{L}'}\Delta_{\ell'} = \Delta_{N'},$$

the equation above is rewritten as $$T_2\geq\max(-\Delta_N,\Delta_{N'},0) \tag{45}$$

If $\Delta_N\geq 0$ and $\Delta_N\leq 0$ then no modelling delay $T_2$ is required, i.e., $T_2=0$.

The total modelling delay T should therefore satisfy the relation $$T \geq \max\left(\max_{\ell\in\mathcal{L}}\tau_{1,\ell},\ \max_{\ell'\in\mathcal{L}'}\right) + \max(-\Delta_N,\ \Delta_{N'},\ 0) \tag{46}$$

When $\tau_{m,\ell}=r_{m,\ell}/c_0$ $$T \geq \frac{1}{c_0}\left[\max\left(\max_{\ell\in\mathcal{L}}r_{1,\ell},\ \max_{\ell'\in\mathcal{L}'}r_{2,\ell'}\right) + \max\left(-(r_{2,N}-r_{1,N}),\ \left(r_{2,N'}-r_{1,N'}\right),\ 0\right)\right] \tag{47}$$

Considering that $\|r_{2,\mathcal{N}}-r_{1,\mathcal{N}}\|\leq\|x_1-x_2\|$ a possible, even if sub-optimal choice for the total modelling delay is $$T = \underbrace{\max_{m,\ell}\frac{r_{m,\ell}}{c_0}}_{T_1} + \underbrace{\frac{\|x_1 - x_2\|}{c_0}}_{T_2} \tag{48}$$

Case of Cross-Talk Cancellation

If the control points $x_1$ and $x_2$ are the two ears of a listener, the system described here is a cross-talk cancellation system. In this case, matrix G is a model of the Head-Related Transfer Function of the loudspeaker array under consideration (may also be a free-field model, in which case G=C). The factor $\Delta_\ell$ represents the Interaural Time Difference (ITD) associated to the $\ell$-th loudspeaker. Ordering the loudspeakers as in equation (16) corresponds to ordering the loudspeakers on based on their ITD. Hence, if $x_1$ is the left ear, $y_1$ will be the location of the leftmost loudspeaker and $y_L$ the location of the rightmost one.

Figure 19:
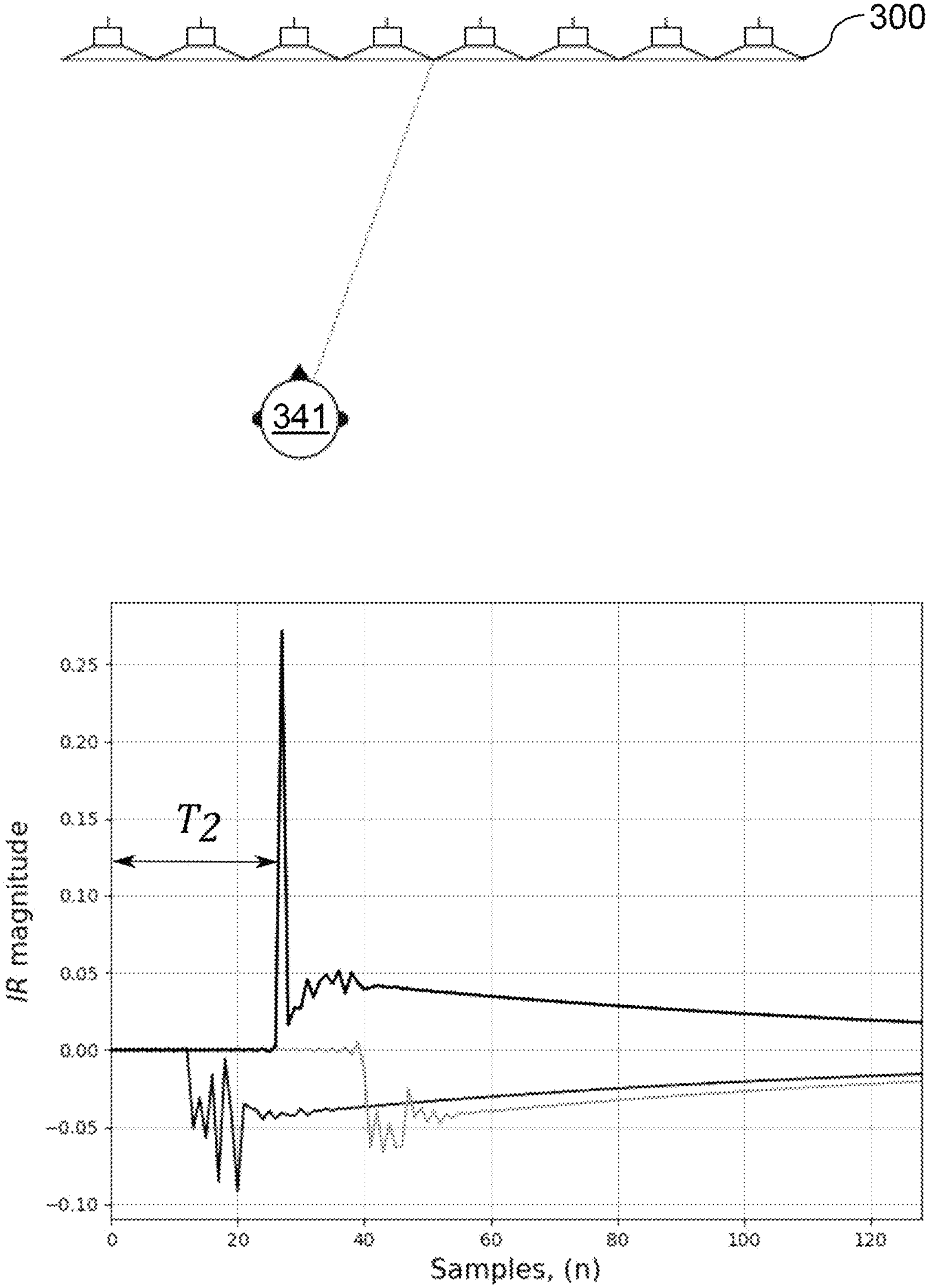
FIG. 19 illustrates a scenario in which a listener is facing an array but not directly looking towards the centre of the array, and shows a zoom of the resultant IF that need a modelling delay T2 to keep causality.

FIG. 19 illustrates a scenario in which a listener is facing an array but not directly looking towards the centre of the array and a zoom of the resultant IF that need a modelling delay $T_2$ to keep causality.

Regarding the modelling delay, if the array is split in two and the listener is pointing their nose towards the centre of the array, no modelling delay is required for the Independent Filters is $T_2=0$. In this case, the filters of the matrix IF look as shown in FIG. 12. If, however, the listener rotates their head and is not looking straight towards the centre of the array (as it is expected to happen in many practical situations), it is required that $T_2>0$. From the point of view of the real-time implementation of this formulation, it is safe to choose the value of $T_2$ that corresponds to the maximum value of $\Delta_\ell$ for any possible system configuration. This corresponds to the maximum Inter-aural Time Difference. If a free-field model is used for the Head-related Transfer Function (shadowless head model), namely if G=C, this delay is the physical distance between the two control points divided by the speed of sound. As discussed above, a possible but sub-optimal choice for the total modelling delay is given by equation 48. More generally, removing the free-field assumption $$T = \underbrace{\max_{m,\ell}\tau_{m,\ell}}_{T_1} + \underbrace{\max ITD}_{T_3} \tag{49}$$

where maxITD is the maximum possible Interaural Time Difference.

A listener with the head not pointing towards the centre of the array and the required modelling delay is shown in the top of FIG. 19. In this case $\mathcal{L}=[1,2,3,4]$ and $\mathcal{L}'=[5,6,7,8]$. A close-up of the impulse responses of the IF is shown in the bottom of FIG. 19, where it can be seen that the first peaks of one of the impulse responses (orange line) precedes in time the main peak of the IF (red line). The modelling delay $T_2$ is therefore required to ensure the causality of all independent filters.

EXAMPLES OF THE PRESENT DISCLOSURE

A signal processing scheme with minimum processing latency.

A system design on the basis of the block diagram of FIG. 17, wherein the loudspeakers have been subdivided into 2 or more subsets.

As above, where the speakers have been subdivided based on option 1 (see eq. 12).

As above, where the speakers have been subdivided based on option 2 (see eq. 16).

As above, where the filters have been designed on the basis of the Hybrid Architecture (see "Variations—Technology 2 architecture").

A (causal) signal processing apparatus with M inputs and L>2 outputs where the L loudspeakers are divided into M subsets of loudspeakers. For a single input signal, all loudspeakers that belong to a given subset have identical driving signals apart from a gain and a delay. The driving signal of the loudspeaker(s) that is the common to two or more subsets of loudspeakers, when it exists, is the sum of the delayed and scaled driving signals of more loudspeakers subsets (see "Consideration on loudspeaker signals").

A signal processing scheme aimed at achieving independent delivery of signals at M control points with an array L>2 speakers, where the theoretical latency between the time when a signal is fed as input to the system and the time when the acoustic signal is received at the control point is less or equal to T as given by equation 48 or 49, that is the maximum time-of-flight of an acoustic wave between any loudspeaker and any control point plus the Euclidean distance between the control points divided by the speed of sound (for eq. 48) or, in case of CTC, the maximum ITD (eq. 49) (see "Considerations on modelling delays").

A causal system that uses a maximum modelling delay which is equal to the inter-aural time difference or Euclidean distance between two pressure control points.

A DSP apparatus as above used for cross-talk cancellation.

A DSP apparatus as above used for delivery of independent signals to multiple listeners.

As above, in a CTC system.

Figure 20:
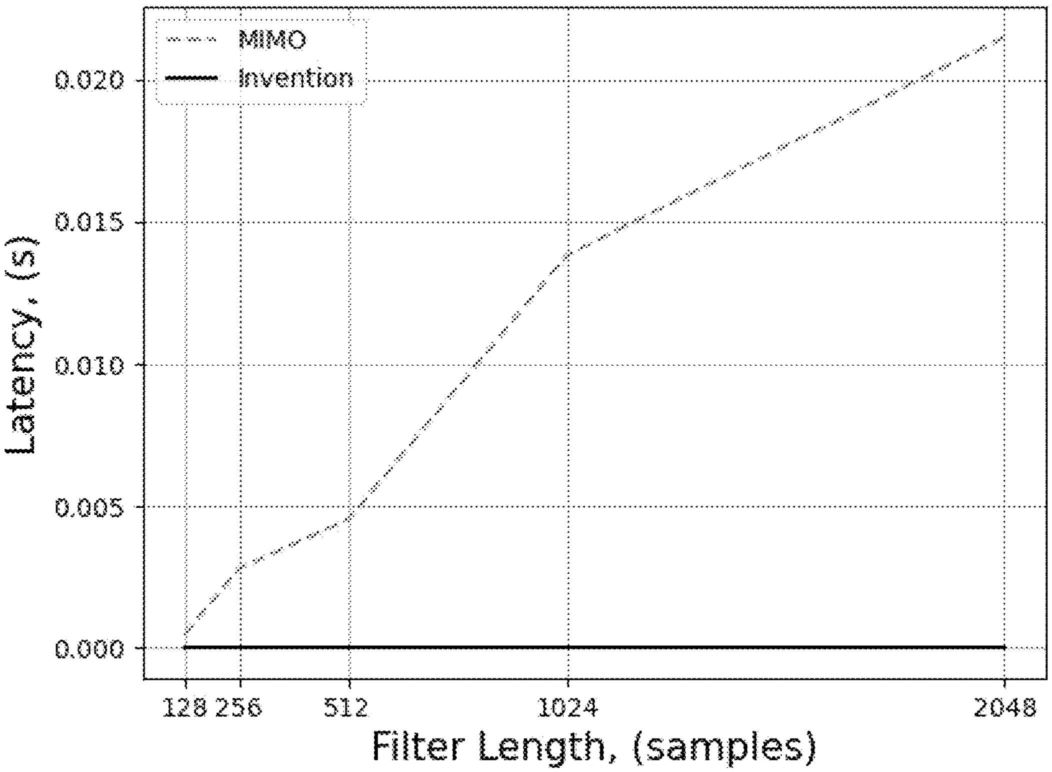
FIG. 20 illustrates measured processing latency comparing a MIMO system, "Conventional approach", (filters calculated according to Eq. 2) with the approach of the present disclosure, "Novel approach" (filters calculated according to Eq. 7)

Systems using Technology 1 and Technology 2 filters can already obtain very low latencies 5-10 ms, however, due to the soundcard input-output latency this is increased to a total of 10-20 ms total latency, which may be too much for certain applications. Furthermore, longer filters require a longer modelling delay and inherent processing latency and that may not be feasible for some applications. A comparison of the measured latency improvement introduced by the approach of the present disclosure is shown in FIG. 20 where this effect is illustrated. The approach of the present disclosure allows the Technology 1 and Technology 2 approaches to be used with minimum processing technology.

FIG. 20 illustrates measured processing latency comparing a MIMO system, "Conventional approach", (filters calculated according to Eq. 2) with the approach of the present disclosure, "Novel approach" (filters calculated according to Eq. 7)

The Technology 1 signal processing scheme is unique with respect to the fact that it allows for a large degree of listener-adaptability at low processing cost using scaled delays. The same applies to the Technology 3 approach.

Another alternative to minimise the system latency, as mentioned above, is the design of the filters using a time-domain approach. This approach, however, is very computationally expensive and it also introduces phase distortion.

One alternative to the approach of the present disclosure is to use two conventional beamformers based on delay and gains only, each steered to one control point. This corresponds to filters equal to $C^H e^{-j\omega T_1}$. The required modelling delay is minimum, but the performance of the system in terms of acoustic contrast or cross-talk cancellation is poor.

Figure 21A:
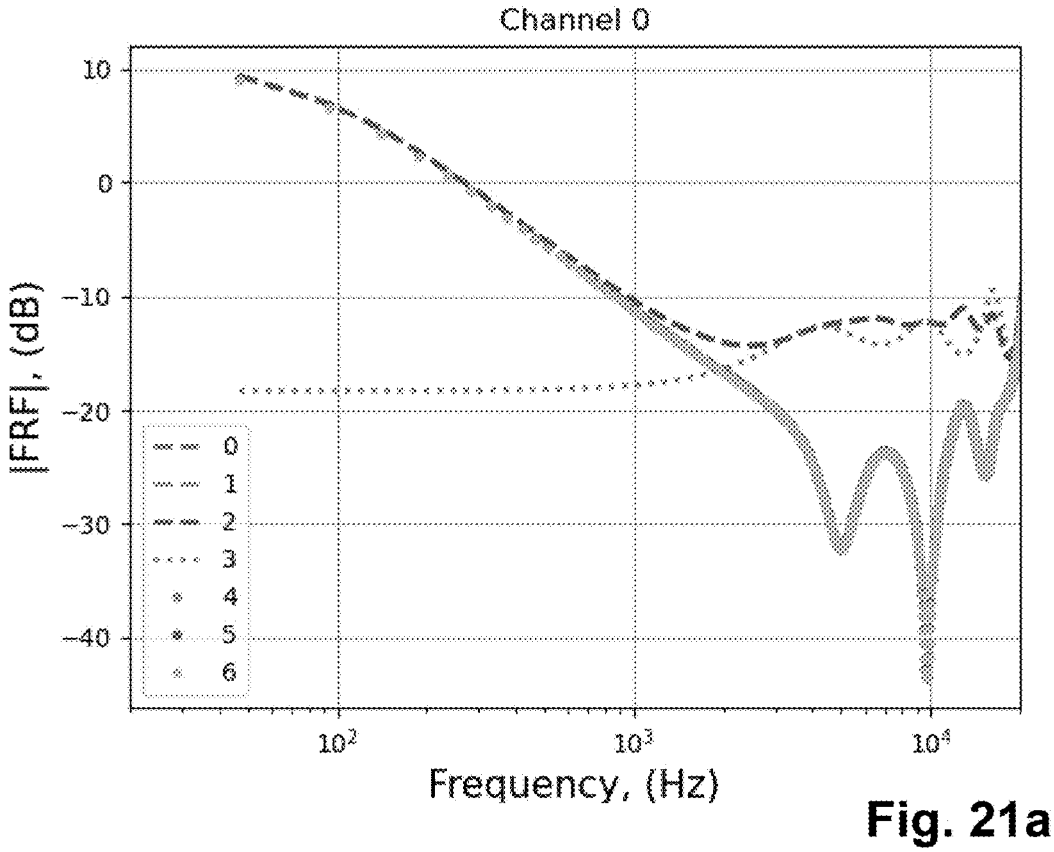
FIGS. 21*a* and 21*b* show a magnitude of the array control filters for both input channels.
Figure 21B:
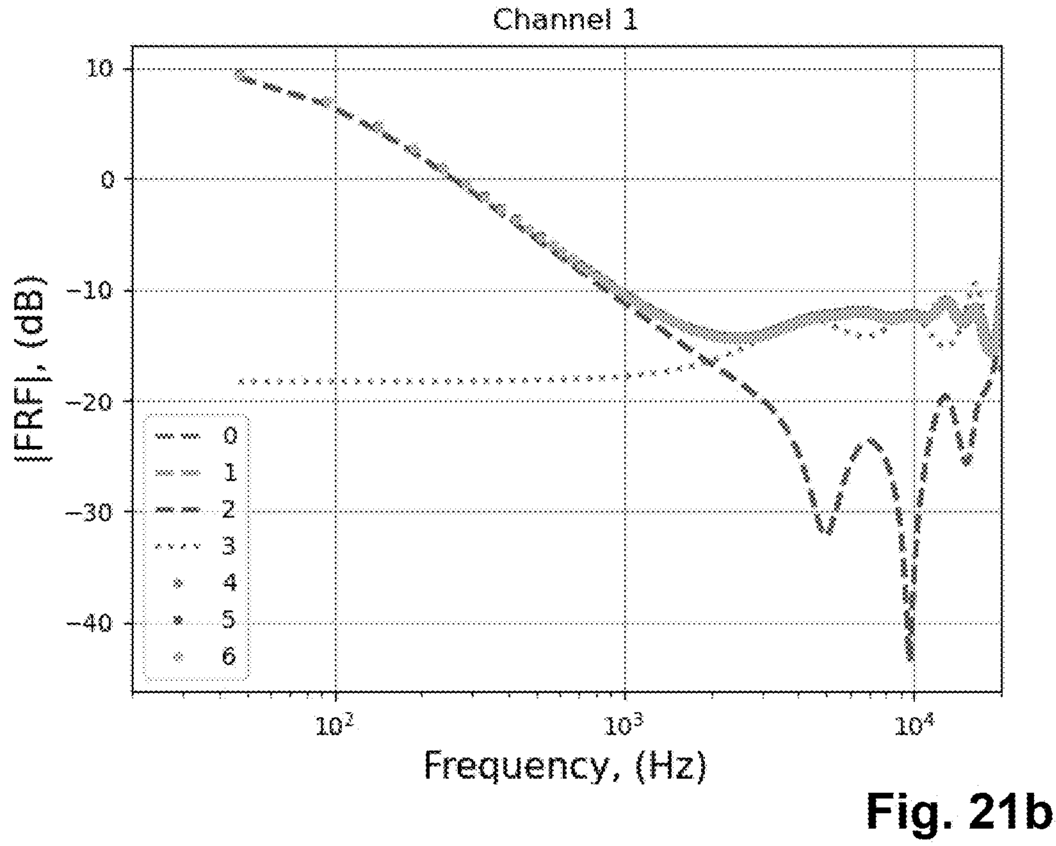

In the presented signal processing scheme, the centre speaker signal is the same for both input channels for a symmetric listener, and all signals feeding the speakers that belong to either $\mathcal{L}$ or $\mathcal{L}'$ are identical apart from a gain and a delay, see the magnitude of the control filters shown in FIGS. 21 and 21*b*.

FIGS. 21*a* and 21*b* show the magnitude of the array control filters for both input channels.

Because this signal processing is substantially different from the conventional filter design method, it would be possible to characterise a system in laboratory conditions and detect the use of the algorithm.

An effect of the present disclosure is to provide a filtering approach with improved stability.

ALTERNATIVE IMPLEMENTATIONS

It will be appreciated that the above approaches can be implemented in many ways. There follows a general description of features which may be common to many implementations of the above approaches. It will of course be understood that, unless indicated otherwise, any of the features of the above approaches may be combined with any of the common features listed below.

There is provided a method of generating audio signals for an array of loudspeakers (e.g., a line array of L loudspeakers).

The method may comprise receiving a plurality of input audio signals [e.g., d]. A respective one of the plurality of input audio signals may be to be reproduced, by the array, at each of a plurality of control points (or 'listening positions') [e.g., $x_1, \ldots, x_M \in \mathbb{R}^3$] in an acoustic environment (or 'acoustic space'). $\mathbb{R}^3$ Each of the plurality of input audio signals may be different.

At least one of the plurality of input audio signals may be different from at least one other one of the plurality of input audio signals.

Each of the plurality of control points may be associated with a respective one of a plurality of loudspeaker groups.

The method may further comprise receiving an estimate of a position of each of the plurality of control points.

The method may further comprise assigning, using the received estimate of the position of each of the plurality of control points, each of the loudspeakers in the array to at least one of the plurality of loudspeaker groups.

The assigning of a particular loudspeaker to a particular loudspeaker group may be based on a relative position of the particular loudspeaker with respect to one or more of the at least one control points associated with the particular loudspeaker group.

The assigning of the particular loudspeaker to the particular loudspeaker group may be based on a length of a path between the particular loudspeaker and one of the at least one control points associated with the particular loudspeaker group, or a path between the particular loudspeaker and a point between the at least one control points associated with the particular loudspeaker group.

The length of the path may be the length of an acoustic path.

The assigning of the particular loudspeaker may comprise:

- determining the length of the path between the particular loudspeaker and each of the plurality of control points; and
- assigning the particular loudspeaker to the loudspeaker group associated with the control point for which the length of the path is shortest.

The assigning of the particular loudspeaker may comprise:

- determining, based on the plurality of control points, a reference control point for each of the loudspeaker groups;
- determining the length of the path between the particular loudspeaker and each of the reference control points; and
- assigning the particular loudspeaker to the loudspeaker group associated with the reference control point for which the length of the path is shortest.

The reference control point of a particular loudspeaker group may be a centroid of the control points associated with the particular loudspeaker group.

The plurality of control points may comprise a first control point associated with a first one of the plurality of loudspeaker groups and a second control point associated with a second one of the plurality of loudspeaker groups, and the assigning may comprise:

- determining the length of the path between each of the loudspeakers in the array and each of the first and second control points;
- determining, for each respective one of the loudspeakers in the array, a path difference between
- the length of the path between the respective one of the loudspeakers in the array and the second control point, and
- the length of the path between the respective one of the loudspeakers in the array and the first control point; and
- assigning each of the loudspeakers in the array to the first or second one of the plurality of loudspeaker groups such that the path difference for each of the at least one loudspeakers assigned to the first one of the plurality of loudspeaker groups is greater than, or equal to, the path difference for any of the at least one loudspeakers assigned to the second one of the plurality of loudspeaker groups.

Each two of the loudspeaker groups may have at most one loudspeaker in common.

The assigning may comprise assigning each of the loudspeakers in the array to at most two of the plurality of loudspeaker groups.

Each of the loudspeaker groups may comprise at least one of the loudspeakers in the array. Each of the loudspeaker groups may comprise at least two of the loudspeakers in the array.

At least two of the loudspeakers in each of the loudspeaker groups may have substantially the same frequency response.

The plurality of input audio signals may comprise:

- a first input audio signal to be reproduced at at least one first control point associated with a first loudspeaker group of the plurality of loudspeaker groups; and
- at least one other input audio signal, wherein the first loudspeaker group may comprise:

a first loudspeaker; and at least one other loudspeaker, the first and at least one other loudspeakers being exclusive to the first loudspeaker group, and wherein, when the at least one other input audio signals are zero, each of the output audio signals for the at least one other loudspeakers may be a respective scaled, delayed version of the output audio signal for the first loudspeaker.

The plurality of input audio signals may consist of:

a first input audio signal to be reproduced at at least one first control point associated with a first loudspeaker group of the plurality of loudspeaker groups; and at least one other input audio signal, wherein the first loudspeaker group may comprise:

a first loudspeaker; and at least one other loudspeaker, the first and at least one other loudspeakers being exclusive to the first loudspeaker group, and wherein, when the at least one other input audio signals are zero, each of the output audio signals for the at least one other loudspeakers may be a respective scaled, delayed version of the output audio signal for the first loudspeaker.

The first loudspeaker and the at least one other loudspeaker may have substantially the same frequency response.

The scaling may be frequency-independent.

The method may further comprise generating (or 'determining') a respective output audio signal [e.g., Hd or q] for each of the loudspeakers in the array by applying a set of filters [e.g., H] to the plurality of input audio signals [e.g., d].

The set of filters may be determined such that, when the output audio signals are generated by applying the set of filters to the plurality of input audio signals and the output audio signals are fed to the array, substantially only the respective one of the plurality of input audio signals is reproduced at each of the plurality of control points.

The output audio signal for the particular loudspeaker may be based on each of the plurality of input audio signals.

The output audio signal for a particular loudspeaker may be generated according to the at least one loudspeaker group to which the particular loudspeaker is assigned.

The estimate of the position of each of the plurality of control points may be received at a first time and the assigning may be at a second time, and the method may further comprise:

at a third time, receiving an estimate of the position of each of the plurality of control points;

at a fourth time, repeating the assigning based on the received estimate of the position of each of the plurality of control points at the third time; and repeating the generating based on the assigning at the fourth time.

The set of filters may be digital filters. The set of filters may be applied in the frequency domain.

The set of filters may be based on a first plurality of filter elements [e.g., $\tilde{C}$ or $\tilde{G}$] comprising a respective filter element for each of the control points and loudspeakers.

For each particular control point and particular loudspeaker:

if the particular loudspeaker is assigned to a loudspeaker group which is associated with the particular control point, the filter element may comprise an approximation [e.g., C or G] of the transfer function between the audio signal applied to the particular loudspeaker and the audio signal received at the particular control point from the particular loudspeaker, and if the particular loudspeaker is assigned to a loudspeaker group which is not associated with the particular control point, the filter element may comprise a reduced value of an approximation [e.g., C or G] of the transfer function between the audio signal applied to the particular loudspeaker and the audio signal received at the particular control point from the particular loudspeaker.

The reduced value may be zero.

Each one of the first plurality of filter elements [e.g., $\tilde{C}$] may be a frequency-independent delay-gain element [e.g., $C_{m,l}=e^{-j\omega\tau(x_m,y_l)}g_{m,l}$].

Each one of the first plurality of filter elements [e.g., $\tilde{C}$] may comprise a delay term [e.g. $e^{-j\omega\tau(x_m,y_l)}$] and/or a gain term [e.g., $g_{m,l}$] that is based on the relative position [e.g., $x_m$] of one of the control points and one of the loudspeakers [e.g. $y_l$].

Each one of the first plurality of filter elements may comprise a delay term [e.g., $e^{-j\omega\tau(x_m,y_l)}$] based on a linear approximation of a phase of a corresponding one of the second plurality of filter elements [e.g., G].

The set of filters may be based on a second plurality of filter elements [e.g., G] comprising a respective filter element for each of the control points and loudspeakers, each filter element comprising an approximation of a respective transfer function between an audio signal applied to a respective one of the loudspeakers and an audio signal received at a respective one of the control points from the respective one of the loudspeakers.

The set of filters may be based on:

a first plurality of filter elements [e.g., G]; and a second plurality of filter elements [e.g., G] comprising a respective filter element for each of the control points and loudspeakers, each filter element comprising an approximation of a respective transfer function between an audio signal applied to a respective one of the loudspeakers and an audio signal received at a respective one of the control points from the respective one of the loudspeakers, wherein the first plurality of filter elements [e.g., $\tilde{G}$] may comprise a subset of the second plurality of filter elements [e.g., G].

The subset may be a strict subset.

A filter element may be a weight of a filter. A plurality of filter elements may be any set of filter weights. A filter element may be any component of a weight of a filter. A plurality of filter elements may be a plurality of components of respective weights of a filter.

The set of filters may comprise:

a first subset of filters [e.g., $[G\acute{C}^H]^{-1}$ or $[G\tilde{G}^H]^{-1}$] based on the first [e.g., $\tilde{C}$ or $\tilde{G}$] and second [e.g., G] pluralities of filter elements; and a second subset of filters [e.g., $\tilde{C}^H$ or $\tilde{G}^H$] based on one of the first [e.g., $\tilde{C}$ or $\tilde{G}$] or second [e.g., G] pluralities of filter elements.

Generating the respective output audio signal for each of the loudspeakers in the array may comprise:

generating a respective intermediate audio signal for each of the control points [e.g., m] by applying the or a first subset of filters [e.g., $[G\tilde{C}^H]^{-1}$ or $[G\tilde{G}^H]^{-1}$] to the input audio signals [e.g., d]; and generating the respective output audio signal for each of the loudspeakers by applying the or a second subset of filters [e.g., $\tilde{C}^H$ or $\tilde{G}^H$] to the intermediate audio signals.

The output audio signal for a particular loudspeaker may be generated by applying, to a subset of the intermediate audio signals, the one or more filters of the second subset of filters corresponding to the particular loudspeaker and the one or more control points associated with the one or more loudspeaker groups to which the particular loudspeaker is assigned, the subset of the intermediate audio signals comprising the one or more intermediate audio signals for the one or more control points associated with the one or more loudspeaker groups to which the particular loudspeaker is assigned.

The array may comprise L loudspeakers of which $L_{common}$ are assigned to more than one of the plurality of loudspeaker groups, the plurality of control points may comprise M control points, and the first subset of filters [e.g., $[G\tilde{C}^H]^{-1}$ or $[G\tilde{G}^H]^{-1}$] may comprise $M^2$ filters and the second subset of filters [e.g., $\tilde{C}^H$ or $\tilde{G}^H$] may comprise at least $L+L_{common}$ filters and at most L×M filters.

The set of filters or the first subset of filters [e.g., $[G\tilde{C}^H]^{-1}$ or $[G\tilde{G}^H]^{-1}$] may be determined based on an inverse of a matrix [e.g., $[G\tilde{C}^H]^{-1}$ or $[G\tilde{G}^H]^{-1}$] containing the first [e.g., $\tilde{C}$ or $\tilde{G}$] and second [e.g., G] pluralities of filter elements.

The matrix [e.g., $[G\tilde{C}^H]^{-1}$ or $[G\tilde{G}^H]$] containing the first [e.g., $\tilde{C}$ or $\tilde{G}$] and second [e.g., G] pluralities of filter elements may be regularised prior to being inverted [e.g., by regularisation matrix A].

The matrix [e.g., $[G\tilde{C}^H]$ or $[G\tilde{G}^H]$] containing the first [e.g., $\tilde{C}$ or $\tilde{G}$] and second [e.g., G] pluralities of filter elements may be determined based on:

- in the frequency domain, a product of a matrix [e.g., G] containing the second plurality of filter elements and a matrix [e.g., $\tilde{C}^H$ or $\tilde{G}^H$] containing the first plurality of filter elements; or
- an equivalent operation in the time domain.

The set of filters may be determined based on:

- in the frequency domain, a product of the or a matrix [e.g., $\tilde{C}^H$ or $\tilde{G}^H$] containing the first plurality of filter elements [e.g., $\tilde{C}$ or $\tilde{G}$] and the inverse of the or a matrix [e.g., $[G\tilde{C}^H]$ or $[G\tilde{G}^H]$] containing the first [e.g., $\tilde{C}$ or $\tilde{G}$] and second [e.g., G] pluralities of filter elements; or
- an equivalent operation in the time domain.

The set of filters may be determined using an optimisation technique.

The first subset of filters may be determined so as to reduce a difference between a scalar matrix (e.g., an identity matrix I) and a matrix comprising a product of: a matrix [e.g., G] comprising the second plurality of filter elements, a matrix [e.g., $\tilde{C}$] comprising the first plurality of filter elements, and a matrix representing the first subset of filters [e.g., IFs].

The approximation for the first plurality of filter elements [e.g., $\tilde{C}$] may be a first approximation and the approximation for the second plurality of filter elements [e.g., G] may be a second approximation.

The first and second approximations may be different. The first and second pluralities of filter elements may be based on different approximations of the transfer functions. In particular, the different approximations may be based on different models of the transfer functions.

The first approximation (e.g., that used to determine C) may be based on a free-field acoustic propagation model and/or a point-source acoustic propagation model.

The second approximation (e.g., that used to determine G) may account for one or more of reflections, refraction, diffraction or scattering of sound in the acoustic environment. The second approximation may alternatively or additionally account for scattering from a head of one or more listeners. The second approximation may alternatively or additionally account for one or more of a frequency response of each of the loudspeakers or a directivity pattern of each of the loudspeakers.

The second approximation may be based on one or more head-related transfer functions, HRTFs. The one or more HRTFs may be measured HRTFs. The one or more HRTFs may be simulated HRTFs. The one or more HRTFs may be determined using a boundary element model of a head.

The second plurality of filter elements may be determined by measuring the set of transfer functions.

The plurality of control points [e.g., $x_1, \ldots, x_M \in \mathbb{R}^3$] may be locations of a corresponding plurality of listeners, e.g., when operating in a 'personal audio' mode.

The plurality of control points [e.g., $x_1, \ldots, x_M \in \mathbb{R}^3$] may be locations of ears of one or more listeners, e.g., when operating in a 'binaural' mode.

The method may further comprise determining the plurality of control points using a position sensor.

Generating the respective output audio signals [e.g., Hd] may comprise using a filter bank to apply at least a portion of the set of filters in a plurality of frequency subbands.

The first subset of filters [e.g., $[G\tilde{C}^H]^{-1}$] and the second subset of filters [e.g., $\tilde{C}^H$] may be applied in each of the frequency subbands.

The first subset of filters [e.g., $[G\tilde{C}^H]^{-1}$] and the second subset of filters [e.g., $\tilde{C}^H$] may be applied within the filter bank.

The first subset of filters [e.g., $[G\tilde{C}^H]^{-1}$] may be applied in fullband and the second subset of filters [e.g., $\tilde{C}^H$] may be applied in each of the frequency subbands. In other words, the first subset of filters [e.g., $[G\tilde{C}^H]^{-1}$] may be applied outside the filter bank and the second subset of filters [e.g., $\tilde{C}^H$] may be applied within the filter bank.

Generating a respective output audio signal for each of the loudspeakers in the array may comprise:

- generating, for each of a first subset of the loudspeakers, a respective output audio signal in a first one of the plurality of frequency subbands; and
- generating, for each of a second subset of the loudspeakers, a respective output audio signal in a second one of the plurality of frequency subbands,
- the first and second subsets of the loudspeakers being different and the first and second ones of the plurality of frequency subbands being different.

The first plurality of filter elements may comprise a first subset of first filter elements for a first one of the plurality of frequency subbands and a second subset of first filter elements for a second one of the plurality of frequency subbands; and/or the second plurality of filter elements may comprise a first subset of second filter elements for the first one of the plurality of frequency subbands and a second subset of second filter elements for the second one of the plurality of frequency subbands.

The first subset of first filter elements and the second subset of first filter elements may be different and/or the first subset of second filter elements and the second subset of second filter elements may be different.

The set of filters [e.g., H] may be time-varying. Alternatively, the set of filters [e.g., H] may be fixed or time-invariant, e.g., when listener positions and head orientations are considered to be relatively static.

The method may further comprise outputting the output audio signals [e.g., Hd or q] to the array of loudspeakers.

The method may further comprise receiving the set of filters [e.g., H], e.g., from another processing device, or from a filter determining module. The method may further comprise determining the set of filters [e.g., H].

At least one of the first plurality of filter elements [e.g., $\tilde{C}$] may be different from a corresponding one of the second plurality of filter elements [e.g., G].

The method may further comprise determining any of the variables listed herein using any of the equations set out herein.

The set of filters may be determined using any of the equations set out herein (e.g., equations 2, 3, 7, 8, 9, 31, 32, 35, 36, 37, etc.).

There is provided an apparatus configured to perform any of the methods described herein.

The apparatus may comprise a digital signal processor configured to perform any of the methods described herein.

The apparatus may comprise the array of loudspeakers.

The apparatus may be coupled, or may be configured to be coupled, to the loudspeaker array.

There is provided a computer program comprising instructions which, when executed by a processing system, cause the processing system to perform any of the methods described herein.

There is provided a (non-transitory) computer-readable medium or a data carrier signal comprising the computer program.

In some implementations, the various methods described above are implemented by a computer program. In some implementations, the computer program includes computer code arranged to instruct a computer to perform the functions of one or more of the various methods described above. In some implementations, the computer program and/or the code for performing such methods is provided to an apparatus, such as a computer, on one or more computer-readable media or, more generally, a computer program product. The computer-readable media is transitory or non-transitory. The one or more computer-readable media could be, for example, an electronic, magnetic, optical, electromagnetic, infrared, or semiconductor system, or a propagation medium for data transmission, for example for downloading the code over the Internet. Alternatively, the one or more computer-readable media could take the form of one or more physical computer-readable media such as semiconductor or solid state memory, magnetic tape, a removable computer diskette, a random access memory (RAM), a read-only memory (ROM), a rigid magnetic disc, or an optical disk, such as a CD-ROM, CD-R/W or DVD.

In an implementation, the modules, components and other features described herein are implemented as discrete components or integrated in the functionality of hardware components such as ASICS, FPGAs, DSPs or similar devices.

A 'hardware component' is a tangible (e.g., non-transitory) physical component (e.g., a set of one or more processors) capable of performing certain operations and configured or arranged in a certain physical manner. In some implementations, a hardware component includes dedicated circuitry or logic that is permanently configured to perform certain operations. In some implementations, a hardware component is or includes a special-purpose processor, such as a field programmable gate array (FPGA) or an ASIC. In some implementations, a hardware component also includes programmable logic or circuitry that is temporarily configured by software to perform certain operations.

Accordingly, the term 'hardware component' should be understood to encompass a tangible entity that is physically constructed, permanently configured (e.g., hardwired), or temporarily configured (e.g., programmed) to operate in a certain manner or to perform certain operations described herein.

In addition, in some implementations, the modules and components are implemented as firmware or functional circuitry within hardware devices. Further, in some implementations, the modules and components are implemented in any combination of hardware devices and software components, or only in software (e.g., code stored or otherwise embodied in a machine-readable medium or in a transmission medium).

Those skilled in the art will recognise that a wide variety of modifications, alterations, and combinations can be made with respect to the above described examples without departing from the scope of the disclosed concepts, and that such modifications, alterations, and combinations are to be viewed as being within the scope of the present disclosure.

It will be appreciated that, although various approaches above may be implicitly or explicitly described as 'optimal', engineering involves tradeoffs and so an approach which is optimal from one perspective may not be optimal from another. Furthermore, approaches which are slightly sub-optimal may nevertheless be useful. As a result, both optimal and sub-optimal solutions should be considered as being within the scope of the present disclosure.

Examples of the present disclosure are set out in the following numbered clauses.

1. A computer-implemented method of generating audio signals for an array of loudspeakers, the method comprising:
   receiving a plurality of input audio signals, wherein a respective one of the plurality of input audio signals is to be reproduced, by the array, at each of a plurality of control points in an acoustic environment, and wherein each of the plurality of control points is associated with a respective one of a plurality of loudspeaker groups;
   receiving an estimate of a position of each of the plurality of control points;
   assigning, using the received estimate of the position of each of the plurality of control points, each of the loudspeakers in the array to at least one of the plurality of loudspeaker groups, wherein the assigning of a particular loudspeaker to a particular loudspeaker group is based on a relative position of the particular loudspeaker with respect to one or more of the at least one control points associated with the particular loudspeaker group; and
   generating a respective output audio signal for each of the loudspeakers in the array by applying a set of filters to the plurality of input audio signals, the output audio signal for a particular loudspeaker being generated according to the at least one loudspeaker group to which the particular loudspeaker is assigned.
2. The method of clause 1, wherein the assigning of the particular loudspeaker to the particular loudspeaker group is based on a length of a path between the particular loudspeaker and one of the at least one control points associated with the particular loudspeaker group, or a path between the particular loudspeaker and a point between the at least one control points associated with the particular loudspeaker group.
3. The method of clause 2, wherein the length of the path is the length of an acoustic path.
4. The method of any of clauses 2 to 3, wherein the assigning of the particular loudspeaker comprises:
   determining the length of the path between the particular loudspeaker and each of the plurality of control points; and
   assigning the particular loudspeaker to the loudspeaker group associated with the control point for which the length of the path is shortest.

5. The method of any of clauses 2 to 3, wherein the assigning of the particular loudspeaker comprises:
   determining, based on the plurality of control points, a reference control point for each of the loudspeaker groups;
   determining the length of the path between the particular loudspeaker and each of the reference control points; and
   assigning the particular loudspeaker to the loudspeaker group associated with the reference control point for which the length of the path is shortest.
6. The method of any of clauses 2 to 3, wherein the plurality of control points comprises a first control point associated with a first one of the plurality of loudspeaker groups and a second control point associated with a second one of the plurality of loudspeaker groups, and the assigning comprises:
   determining the length of the path between each of the loudspeakers in the array and each of the first and second control points;
   determining, for each respective one of the loudspeakers in the array, a path difference between
      the length of the path between the respective one of the loudspeakers in the array and the second control point, and
      the length of the path between the respective one of the loudspeakers in the array and the first control point; and
   assigning each of the loudspeakers in the array to the first or second one of the plurality of loudspeaker groups such that the path difference for each of the at least one loudspeakers assigned to the first one of the plurality of loudspeaker groups is greater than, or equal to, the path difference for any of the at least one loudspeakers assigned to the second one of the plurality of loudspeaker groups.
7. The method of any preceding clause, wherein the plurality of input audio signals comprises:
   a first input audio signal to be reproduced at at least one first control point associated with a first loudspeaker group of the plurality of loudspeaker groups; and
   at least one other input audio signal, wherein the first loudspeaker group comprises:
   a first loudspeaker; and
   at least one other loudspeaker, the first and at least one other loudspeakers being exclusive to the first loudspeaker group, and wherein, when the at least one other input audio signals are zero, each of the output audio signals for the at least one other loudspeakers is a respective scaled, delayed version of the output audio signal for the first loudspeaker.

8. The method of any preceding clause, wherein the plurality of control points are locations of a plurality of listeners or locations of ears of one or more listeners.
9. The method of any preceding clause, wherein the estimate of the position of each of the plurality of control points is received at a first time and the assigning is at a second time, and wherein the method further comprises:
   at a third time, receiving an estimate of the position of each of the plurality of control points;
   at a fourth time, repeating the assigning based on the received estimate of the position of each of the plurality of control points at the third time; and
   repeating the generating based on the assigning at the fourth time.
10. The method of any preceding clause, wherein the set of filters is based on a first plurality of filter elements comprising a respective filter element for each of the control points and loudspeakers, wherein, for each particular control point and particular loudspeaker:
   if the particular loudspeaker is assigned to a loudspeaker group which is associated with the particular control point, the filter element comprises an approximation of the transfer function between the audio signal applied to the particular loudspeaker and the audio signal received at the particular control point from the particular loudspeaker, and
   if the particular loudspeaker is assigned to a loudspeaker group which is not associated with the particular control point, the filter element comprises a reduced value of an approximation of the transfer function between the audio signal applied to the particular loudspeaker and the audio signal received at the particular control point from the particular loudspeaker.
11. The method of clause 10, wherein the set of filters is based on a second plurality of filter elements comprising a respective filter element for each of the control points and loudspeakers, each filter element comprising an approximation of a respective transfer function between an audio signal applied to a respective one of the loudspeakers and an audio signal received at a respective one of the control points from the respective one of the loudspeakers.
12. The method of any of clauses 10 to 11, wherein the approximation for the first plurality of filter elements is based on a free-field acoustic propagation model and/or the approximation for the second plurality of filter elements accounts for one or more of reflection, refraction, diffraction or scattering of sound in the acoustic environment.
13. The method of any preceding clause, wherein generating the respective output audio signal for each of the loudspeakers in the array comprises:
   generating a respective intermediate audio signal for each of the control points by applying a first subset of filters to the input audio signals; and
   generating the respective output audio signal for each of the loudspeakers by applying a second subset of filters to the intermediate audio signals.
14. The method of clause 13, wherein the output audio signal for a particular loudspeaker is generated by applying, to a subset of the intermediate audio signals, the one or more filters of the second subset of filters corresponding to the particular loudspeaker and the one or more control points associated with the one or more loudspeaker groups to which the particular loudspeaker is assigned, the subset of the intermediate audio signals comprising the one or more intermediate audio signals for the one or more control points associated with the one or more loudspeaker groups to which the particular loudspeaker is assigned.
15. An apparatus configured to perform the method of any preceding clause, or
   a computer program comprising instructions which, when executed by a processing system, cause the processing system to perform the method of any preceding clause, or
   a computer-readable medium comprising instructions which, when executed by a processing system, cause the processing system to perform the method of any preceding clause, or a data carrier signal comprising instructions which, when executed by a processing system, cause the processing system to perform the method of any preceding clause.

Those skilled in the art will also recognise that the scope of the invention is not limited by the examples described herein, but is instead defined by the appended claims.

The invention claimed is:

1. A computer-implemented method of generating audio signals for an array of loudspeakers, the method comprising:

receiving a plurality of input audio signals, wherein a respective one of the plurality of input audio signals is to be reproduced, by the array, at each of a plurality of control points in an acoustic environment, and wherein each of the plurality of control points is associated with a respective one of a plurality of loudspeaker groups;

receiving an estimate of a position of each of the plurality of control points;

assigning, using the received estimate of the position of each of the plurality of control points, each of the loudspeakers in the array to at least one of the plurality of loudspeaker groups, wherein the assigning of a particular loudspeaker to a particular loudspeaker group comprises determining a relative position of the particular loudspeaker with respect to one or more of the at least one control points associated with the particular loudspeaker group; and generating a respective output audio signal for each of the loudspeakers in the array by applying a set of filters to the plurality of input audio signals, the output audio signal for a particular loudspeaker being generated according to the at least one loudspeaker group to which the particular loudspeaker is assigned, wherein the set of filters is based on a first plurality of filter elements comprising a respective filter element for each of the control points and loudspeakers, wherein, for each particular control point and particular loudspeaker:

if the particular loudspeaker is assigned to a loudspeaker group which is associated with the particular control point, the filter element comprises an approximation of the transfer function between the audio signal applied to the particular loudspeaker and the audio signal received at the particular control point from the particular loudspeaker, and if the particular loudspeaker is assigned to a loudspeaker group which is not associated with the particular control point, the filter element comprises a reduced value of an approximation of the transfer function between the audio signal applied to the particular loudspeaker and the audio signal received at the particular control point from the particular loudspeaker.

2. The method of claim 1, wherein the assigning of the particular loudspeaker to the particular loudspeaker group comprises determining a length of a path between the particular loudspeaker and one of the at least one control points associated with the particular loudspeaker group, or a path between the particular loudspeaker and a point between the at least one control points associated with the particular loudspeaker group.

3. The method of claim 2, wherein the length of the path is the length of an acoustic path.

4. The method of claim 2, wherein the assigning of the particular loudspeaker comprises:

determining the length of the path between the particular loudspeaker and each of the plurality of control points; and assigning the particular loudspeaker to the loudspeaker group associated with the control point for which the length of the path is shortest.

5. The method of claim 2, wherein the assigning of the particular loudspeaker comprises:

determining, based on the plurality of control points, a reference control point for each of the loudspeaker groups;

determining the length of the path between the particular loudspeaker and each of the reference control points; and assigning the particular loudspeaker to the loudspeaker group associated with the reference control point for which the length of the path is shortest.

6. The method of claim 2, wherein the plurality of control points comprises a first control point associated with a first one of the plurality of loudspeaker groups and a second control point associated with a second one of the plurality of loudspeaker groups, and the assigning comprises:

determining the length of the path between each of the loudspeakers in the array and each of the first and second control points;

determining, for each respective one of the loudspeakers in the array, a path difference between the length of the path between the respective one of the loudspeakers in the array and the second control point, and the length of the path between the respective one of the loudspeakers in the array and the first control point; and assigning each of the loudspeakers in the array to the first or second one of the plurality of loudspeaker groups such that the path difference for each of the at least one loudspeakers assigned to the first one of the plurality of loudspeaker groups is greater than, or equal to, the path difference for any of the at least one loudspeakers assigned to the second one of the plurality of loudspeaker groups.

7. The method of claim 2, wherein the assigning is by a computer.

8. The method of claim 1, wherein the plurality of input audio signals comprises:

a first input audio signal to be reproduced at at least one first control point associated with a first loudspeaker group of the plurality of loudspeaker groups; and at least one other input audio signal, wherein the first loudspeaker group comprises:

a first loudspeaker; and at least one other loudspeaker, the first and at least one other loudspeakers being exclusive to the first loudspeaker group, and wherein, when the at least one other input audio signals are zero, each of the output audio signals for the at least one other loudspeakers is a respective scaled, delayed version of the output audio signal for the first loudspeaker.

9. The method of claim 1, wherein the plurality of control points are locations of a plurality of listeners or locations of ears of one or more listeners.

10. The method of claim 1, wherein the estimate of the position of each of the plurality of control points is received at a first time and the assigning is at a second time, and wherein the method further comprises:

at a third time, receiving an estimate of the position of each of the plurality of control points;

at a fourth time, repeating the assigning based on the received estimate of the position of each of the plurality of control points at the third time; and repeating the generating based on the assigning at the fourth time.

11. The method of claim 1, wherein the reduced value is zero.

12. The method of claim 1, wherein the estimate is received from a position sensor.

13. The method of claim 1, wherein the receiving of the plurality of input audio signals is by a computer, and the receiving of the estimates, the assigning and the generating are by the computer.

14. The method of claim 1, wherein at least one of the receiving of the estimates or the assigning is performed subsequent to the receiving of the plurality of input audio signals.

15. The method of claim 1, wherein the plurality of control points are locations of ears of one or more listeners.

16. The method of claim 1, wherein the set of filters is determined based on an inverse of a matrix containing the first plurality of filter elements.

17. The method of claim 16, wherein the matrix has M×L elements, where M is the number of control points and L is the number of loudspeakers in the array.

18. The method of claim 1, wherein the set of filters is determined based on an inverse of an activation matrix comprising a respective filter element for each of the control points and loudspeakers, and wherein, for each particular control point and particular loudspeaker:

if the particular loudspeaker is assigned to a loudspeaker group which is associated with the particular control point, the filter element comprises an approximation of a corresponding element of a plant matrix, and if the particular loudspeaker is assigned to a loudspeaker group which is not associated with the particular control point, the filter element comprises a reduced value of an approximation of the corresponding element of the plant matrix.

19. An apparatus comprising a processor configured to:

receive a plurality of input audio signals, wherein a respective one of the plurality of input audio signals is to be reproduced, by an array of loudspeakers, at each of a plurality of control points in an acoustic environment, and wherein each of the plurality of control points is associated with a respective one of a plurality of loudspeaker groups;

receive an estimate of a position of each of the plurality of control points;

assign, using the received estimate of the position of each of the plurality of control points, each of the loudspeakers in the array to at least one of the plurality of loudspeaker groups, wherein the assigning of a particular loudspeaker to a particular loudspeaker group comprises determining a relative position of the particular loudspeaker with respect to one or more of the at least one control points associated with the particular loudspeaker group; and generate a respective output audio signal for each of the loudspeakers in the array by applying a set of filters to the plurality of input audio signals, the output audio signal for a particular loudspeaker being generated according to the at least one loudspeaker group to which the particular loudspeaker is assigned, wherein the set of filters is based on a first plurality of filter elements comprising a respective filter element for each of the control points and loudspeakers, wherein, for each particular control point and particular loudspeaker:

if the particular loudspeaker is assigned to a loudspeaker group which is associated with the particular control point, the filter element comprises an approximation of the transfer function between the audio signal applied to the particular loudspeaker and the audio signal received at the particular control point from the particular loudspeaker, and if the particular loudspeaker is assigned to a loudspeaker group which is not associated with the particular control point, the filter element comprises a reduced value of an approximation of the transfer function between the audio signal applied to the particular loudspeaker and the audio signal received at the particular control point from the particular loudspeaker.

20. A non-transitory computer-readable medium comprising instructions which, when executed by a processing system, cause the processing system to:

receive a plurality of input audio signals, wherein a respective one of the plurality of input audio signals is to be reproduced, by an array of loudspeakers, at each of a plurality of control points in an acoustic environment, and wherein each of the plurality of control points is associated with a respective one of a plurality of loudspeaker groups;

receive an estimate of a position of each of the plurality of control points;

assign, using the received estimate of the position of each of the plurality of control points, each of the loudspeakers in the array to at least one of the plurality of loudspeaker groups, wherein the assigning of a particular loudspeaker to a particular loudspeaker group comprises determining a relative position of the particular loudspeaker with respect to one or more of the at least one control points associated with the particular loudspeaker group; and generate a respective output audio signal for each of the loudspeakers in the array by applying a set of filters to the plurality of input audio signals, the output audio signal for a particular loudspeaker being generated according to the at least one loudspeaker group to which the particular loudspeaker is assigned, wherein the set of filters is based on a first plurality of filter elements comprising a respective filter element for each of the control points and loudspeakers, wherein, for each particular control point and particular loudspeaker:

if the particular loudspeaker is assigned to a loudspeaker group which is associated with the particular control point, the filter element comprises an approximation of the transfer function between the audio signal applied to the particular loudspeaker and the audio signal received at the particular control point from the particular loudspeaker, and if the particular loudspeaker is assigned to a loudspeaker group which is not associated with the particular control point, the filter element comprises a reduced value of an approximation of the transfer function between the audio signal applied to the particular loudspeaker and the audio signal received at the particular control point from the particular loudspeaker.

* * * * *